US012459094B2

(12) United States Patent
Ying et al.

(10) Patent No.: US 12,459,094 B2
(45) Date of Patent: Nov. 4, 2025

(54) STRIKER DRIVING MECHANISM AND NAIL GUN HAVING SAME

(71) Applicant: TAIZHOU DAJIANG IND. CO. LTD., Wenling (CN)

(72) Inventors: Qinling Ying, Wenling (CN); Mingjun Yang, Wenling (CN); Shangshi Cai, Wenling (CN); Bingzhen Jiang, Wenling (CN); Tao Yang, Wenling (CN); Haijun Li, Wenling (CN)

(73) Assignee: TAIZHOU DAJIANG IND. CO. LTD., Wenling (CN)

( * ) Notice: Subject to any disclaimer, the term of this patent is extended or adjusted under 35 U.S.C. 154(b) by 0 days.

(21) Appl. No.: 18/676,633

(22) Filed: May 29, 2024

(65) Prior Publication Data

US 2024/0326209 A1 Oct. 3, 2024

Related U.S. Application Data

(63) Continuation of application No. PCT/CN2022/101890, filed on Jun. 28, 2022.

(30) Foreign Application Priority Data

Nov. 29, 2021 (CN) ......................... 202111434574.6

(51) Int. Cl.
*B25C 1/06* (2006.01)

(52) U.S. Cl.
CPC ...................................... *B25C 1/06* (2013.01)

(58) Field of Classification Search
CPC .. B25C 1/06; B25C 5/15; B25C 1/008; B25C 1/00; B25C 7/00
See application file for complete search history.

(56) References Cited

U.S. PATENT DOCUMENTS

2017/0326715 A1* 11/2017 Chen ......................... B25C 1/04

FOREIGN PATENT DOCUMENTS

CN 205765974 U 12/2016
CN 106794573 A 5/2017
(Continued)

OTHER PUBLICATIONS

Machine Translation of CN 214723919 U (Year: 2021).*
(Continued)

*Primary Examiner* — Veronica Martin
(74) *Attorney, Agent, or Firm* — Troutman Pepper Locke LLP; Tim Tingkang Xia, Esq.

(57) ABSTRACT

A striker driving mechanism and a nail gun having the same. The striker driving mechanism includes a frame structure; a piston movably arranged between in the frame structure; at least one spring disposed between the piston and the frame structure and configured to provide driving force for movements of the piston; and a pushing member having a pushing end toward the piston and configured to push the piston toward the at least one spring, thereby compressing the at least one spring to store energy therein. The striker is co-movably connected to the piston. The piston comprises a piston body, made of lightweight materials; and a piston protector, configured to match the push end of the pushing member and installed on the piston body and facing the push member, wherein the piston protector is made of wear-resistant material.

19 Claims, 17 Drawing Sheets

(56) References Cited

FOREIGN PATENT DOCUMENTS

| | | | | |
|---|---|---|---|---|
| CN | 212372113 | U | | 1/2021 |
| CN | 214081257 | U | * | 8/2021 |
| CN | 214723919 | U | * | 11/2021 |
| CN | 113977529 | A | | 1/2022 |
| WO | 2008123485 | A1 | | 10/2008 |

OTHER PUBLICATIONS

Machine Translation of CN-214081257-U (Year: 2021).*
Chinese Intellectual Property Office (ISR/CN), "International Search Report for PCT/CN2022/101890", China, Sep. 7, 2022.

* cited by examiner

STRIKER DRIVING MECHANISM AND NAIL GUN HAVING SAME

CROSS-REFERENCE TO RELATED PATENT APPLICATIONS

This application is a continuation application of International Patent Application No. PCT/CN2022/101890, filed Jun. 28, 2022, which itself claims priority to Chinese Patent Application No. 202111434574.6, filed Nov. 29, 2021, which are hereby incorporated herein in their entireties by reference.

FIELD OF THE INVENTION

This invention relates generally to nail guns, and more particularly to a nail striker driving mechanism and a nail gun having the same.

BACKGROUND OF THE INVENTION

The background description provided herein is for the purpose of generally presenting the context of the invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

A nail gun is a fastening tool that is mostly used in construction. Currently, a widely used nail gun is an electric nail gun powered with lithium batteries. This nail gun is driven to push a piston by a drive motor and a corresponding transmission structure, and then the piston compresses a spring to store energy. When firing nails, the piston does work instantaneously under an action of spring force. The weight of the piston directly affects the nail firing force and the rebound force. The heavier the piston is, the smaller the nail firing force and the greater the rebound force. In the existing nail gun, the piston is mostly made of iron material, so it is heavier and has a greater impact on the nail firing force.

To overcome the problems and achieve a desired nail firing force, there are two improvement measures: one is to increase the elastic force of the force supply spring to increase the nail firing force. However, this method causes an increase in energy consumption, that is, the number of nail firings within a battery cycle decreases. Meanwhile, the increase in the spring force also causes the rebound force to increase. Therefore, when a user holds the nail gun to fire nails, he/she needs to press the nail gun firmly to meet the operation requirements, which increases the labor intensity and leads to poor user experience. The other method is to add an anti-shock device to the nail gun to reduce the rebound force of the piston and therefore increase the nail firing force. However, the addition of the anti-shock device makes the structure of the nail gun more complex and requires higher accuracy for each part, thereby increasing the cost and the manufacturing difficulty of the nail gun, and the difficulty of user self-maintenance. Therefore, a heretofore unaddressed need exists in the art to address the aforementioned deficiencies and inadequacies.

SUMMARY OF THE INVENTION

One of the objectives of this invention is to provide a nail driving mechanism and a nail gun having the same to solve the above problems.

In one aspect, the invention relates to a striker driving mechanism used for driving a striker of a nail gun to fire nails. The striker driving mechanism includes a frame structure; a piston movably arranged between in the frame structure; at least one spring disposed between the piston and the frame structure and configured to provide driving force for movements of the piston; and a pushing member having a pushing end toward the piston, and configured to push the piston toward the at least one spring, thereby compressing the at least one spring to store energy therein. The striker is co-movably connected to the piston.

The piston comprises a piston body, made of lightweight materials; and a piston protector, configured to match the push end of the pushing member and installed on the piston body and facing the push member, wherein the piston protector is made of wear-resistant material.

In one embodiment, the piston body is made of an aluminum material and has a push portion extending toward the pushing member; and the piston protector is made of an iron material covering the pushing portion, or titanium coating on the push portion.

In one embodiment, the piston protector is made of an iron material; and the piston body is made of plastic and is cast on the piston protector through an iron-plastic composite method to form an integrated piece.

In one embodiment, the striker driving mechanism further comprises a guide rod installed in the frame structure and extending along the length of the frame structure; and at least a pair of rolling elements are respectively rollably fitted on both sides of the piston and are respectively in contact with the frame structure, wherein the at least one spring is sleeved on the guide rods; and the piston has a sleeving through hole defined the middle portion of the piston body, and the piston is movably sleeved on the guide rod through the sleeving through hole.

In one embodiment, the piston further has a plurality of exhausting through holes distributed around the sleeving through hole, wherein the extension direction of each exhausting through hole is consistent with the length direction of the guide rod.

In one embodiment, the frame structure has two regulating plates, two regulating plates extending along the length direction of the frame structure; and the piston body has two grooves defined both sides thereof, wherein the pair of rolling elements are respectively rollably engaged in the two grooves and are respectively in contact with the regulating plates on the corresponding side.

In one embodiment, each rolling element are a ball; and each groove is a round bottom groove matching the ball, wherein a diameter of the ball is greater than a depth of the groove.

In one embodiment, the guide rod is a circular or square rod; and the sleeving through hole is a circular or square through hole matching the guide rod.

In one embodiment, the piston protector comprises a first piston protection member and a second piston protection member; the first piston protection member and the second piston protection member are attached onto the piston body to form a first thrust end and a second thrust end, respectively; the first thrust end extends from the piston body along the nail firing direction; the second thrust end extends from the piston body perpendicularly to the first thrust end and toward the pushing member; the pushing member includes a wheel body and a first pushing protrusion and a second pushing protrusion arranged on the wheel body and facing the piston; the first pushing protrusion and the second pushing protrusion are the pushing ends; the height of the first pushing protrusion is higher than that of the second pushing protrusion; the first pushing protrusion is arranged corresponding to the first thrust end; the second pushing protrusion corresponds to the setting of the second thrust end.

When the wheel body rotates, the second pushing protrusion abuts against the second thrust end and pushes the second thrust end, so that the piston moves toward the at least one spring, thereby causing the at least one spring to perform a first stage of energy storage. After the first stage of energy storage is completed, the first pushing protrusion in in contact with the first thrust end and pushes the first thrust end, so that the piston moves further toward the at least one spring, thereby causing the at least one spring to perform a second stage of energy storage.

In one embodiment, the striker driving mechanism further comprises a driving motor for driving the pushing member to rotate, the rotation of the pushing member drives the first and second thrust ends to move, thereby pushing the piston to move toward the at least one spring; and one-way bearing, coupled to the driving motor for limiting the driving motor to rotate only in one direction, wherein the wheel body is coupled to an output end of the driving motor.

In one embodiment, the piston further comprises a striker mounting portion formed on a top side of the piston body; and the striker has a mounting portion that is detachably mounted onto the striker mounting portion through screws and/or snap-in connection means so that the striker is operably co-moved with the piston.

In one embodiment, each of the mounting portion of the striker and the striker mounting portion of the piston has at least one mounting hole through which a screw or a snap-in connector detachably mounts the mounting portion of the striker onto the striker mounting portion of the piston, wherein the snap-in connector having a cap and a post extending from the cap and inserted into the at least one mounting hole.

In one embodiment, the striker mounting portion of the piston has a limiting part vertically extending from an edge of the striker mounting portion; one of the mounting portion of the striker and the striker mounting portion of the piston has at least one post, and the other of the mounting portion of the striker and the striker mounting portion of the piston has at least one hole corresponding to the at least one post; and when assembled, the at least one post of the one of the mounting portion of the striker and the striker mounting portion of the piston is snapped and received in the at least mounting hole of the other of the mounting portion of the striker and the striker mounting portion of the piston, and the mounting portion of the striker is in contact with the limiting part of the striker mounting portion of the piston.

In one embodiment, the limiting part of the striker mounting portion of the piston is a hook-shaped member, wherein the hook-shaped member has a first extension section vertically extending from the edge of the striker mounting portion toward the striker baffle plate and having a height, with its extending direction perpendicular to the motion direction of the piston; a second extension section extending from the end of the first extension section toward the muzzle, with its extension direction parallel to the motion direction of the piston. The height of the first extension section is greater than a thickness of the striker. The distance between the first extension section and the at least one post or the at least mounting hole of the striker mounting portion is greater than the distance from the end of the striker to the at least mounting hole or the at least one post of the striker. Along the motion direction of the piston, the distance between the end of the second extension section and the at least one post or the at least mounting hole of the striker mounting portion is less than the distance from the end of the striker to the at least mounting hole or the at least one post of the striker.

In one embodiment, the striker mounting portion of the piston has a mounting hole; the mounting portion of the striker has a tab vertically extending from its end, wherein the tab is corresponding to the mounting hole; and when assembled, the tap of the mounting portion of the striker is snapped and received in the mounting hole of the striker mounting portion of the piston.

In another aspect, the invention relates to a nail gun for nailing comprising the striker driving mechanism as disclosed above. The piston further comprises a striker mounting portion formed on a top side of the piston body; and the striker has a mounting portion that is detachably mounted onto the striker mounting portion through screws and/or snap-in means so that the striker is operably co-moved with the piston.

In one embodiment, the nail gun further comprises a body casing configured to house the striker driving mechanism therein, and having an opening defined in a tap of the body casing for facilitating maintenance of the striker driving mechanism; and a striker baffle plate detachably attached onto the body casing to cover the opening.

In one embodiment, the striker baffle plate is detachably attached onto the body casing by screws and/or snap-in connection means.

In one embodiment, the striker baffle plate has a buckle formed on its end, and the body casing has a slot configured such that, as assembled, the buckle of the striker baffle plate is engaged with the slot of the body casing to restrict the striker baffle plate from moving in the nail firing direction.

In one embodiment, the buckle comprises a first extension portion extending substantially vertically downward from an inner side of the striker baffle plate and a second extension portion extending from the first extension portion along the length direction of the striker baffle plate, wherein as assembled, the second extension portion extends into the slot of the body casing to engage the buckle with the slot.

According to embodiments of the invention, the striker driving mechanism includes a frame structure; a piston movably arranged between in the frame structure; at least one spring disposed between the piston and the frame structure and configured to provide driving force for movements of the piston; and a pushing member having a pushing end toward the piston and configured to push the piston toward the at least one spring, thereby compressing the at least one spring to store energy therein. The piston includes a piston body and a piston protector mounted on the piston body and facing the pushing member. Additionally, the piston body is made of light materials, the overall weight of the piston is greatly reduced, so it can effectively improve the nailing force without increasing energy consumption. Because the pushing ends of the pushing member do not directly contact the piston but abut against the piston protector and push the piston through the piston protector, and the piston protector is made of wear-resistant material, thus reducing the wear generated during the movement of the piston, so that the piston has a longer service life.

In addition, the nail gun has the striker baffle plate detachably installed on the opening of the housing, and the opening position corresponds to the mounting portion of the striker. Therefore, replacing the striker through the opening eliminates the need to disassemble the entire casing, remove and disassemble many internal components. Further, the striker and the piston are connected to each other by screws and/or snap-in connection means, which makes replacement and installation of the striker much easier for ordinary users.

These and other aspects of the invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

DETAILED DESCRIPTION OF THE INVENTION

Figure 1:
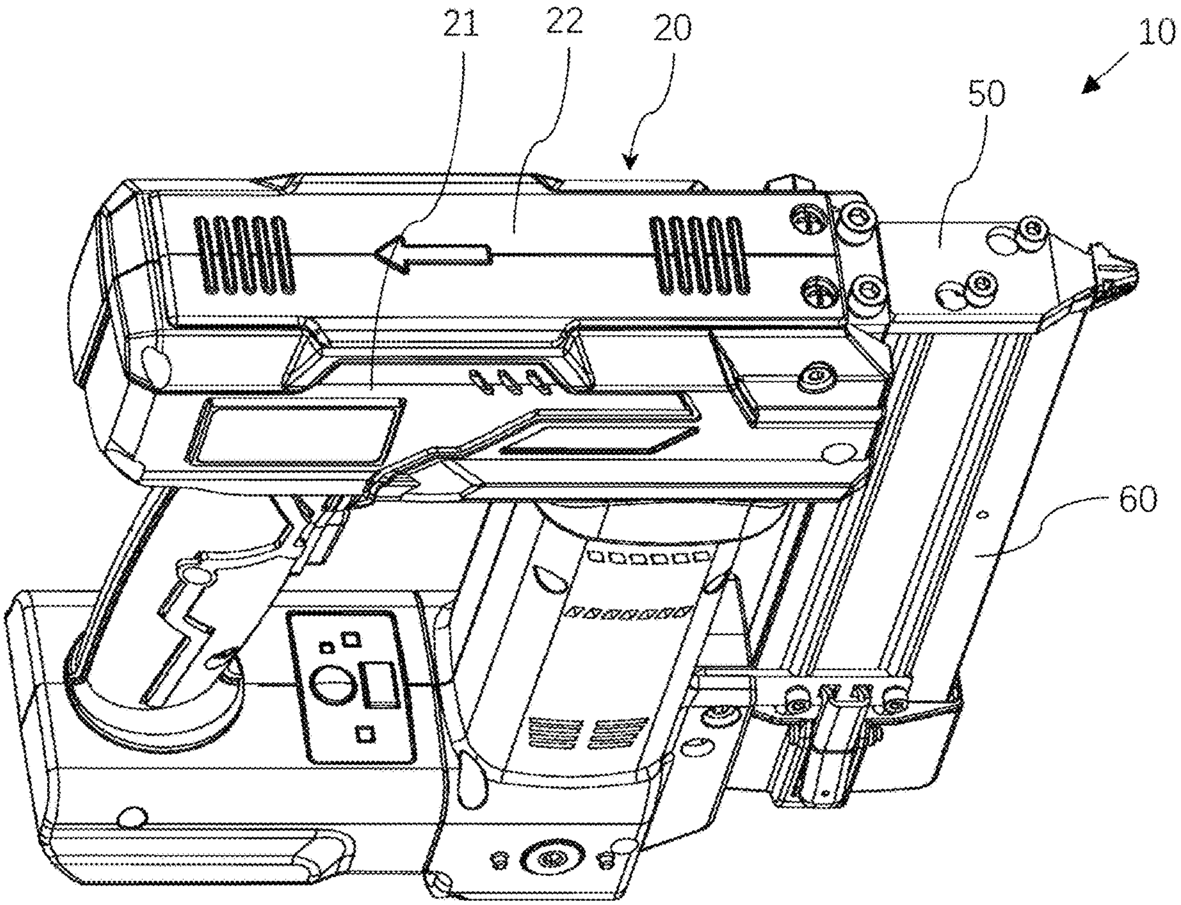
FIG. 1 shows schematically a perspective view of a nail gun according to one embodiment of the invention.

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are configured to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

As used herein, "around", "about", "substantially" or "approximately" shall generally mean within 20 percent, preferably within 10 percent, and more preferably within 5 percent of a given value or range. Numerical quantities given herein are approximate, meaning that the term "around", "about" "substantially" or "approximately" can be inferred if not expressly stated.

As used in this specification, the phrase "at least one of A, B, and C" should be construed to mean a logical (A or B or C), using a non-exclusive logical OR. As used herein, the term "and/or" includes any and all combinations of one or more of the associated listed items.

Embodiments of the invention are illustrated in detail hereinafter with reference to accompanying drawings. The description below is merely illustrative in nature and is in no way intended to limit the invention, its application, or uses. The broad teachings of the invention can be implemented in a variety of forms. Therefore, while this invention includes particular examples, the true scope of the invention should not be so limited since other modifications will become apparent upon a study of the drawings, the specification, and the following claims. For purposes of clarity, the same reference numbers will be used in the drawings to identify similar elements. It should be understood that one or more steps within a method may be executed in different order (or concurrently) without altering the principles of the invention.

In accordance with the purposes of this invention, as embodied and broadly described herein, this invention, in certain aspects, relates to a striker driving mechanism and a nail gun with the striker driving mechanism. Embodiments of the invention are now described in conjunction with the accompanying drawings in FIGS. 1-33.

Figure 2:
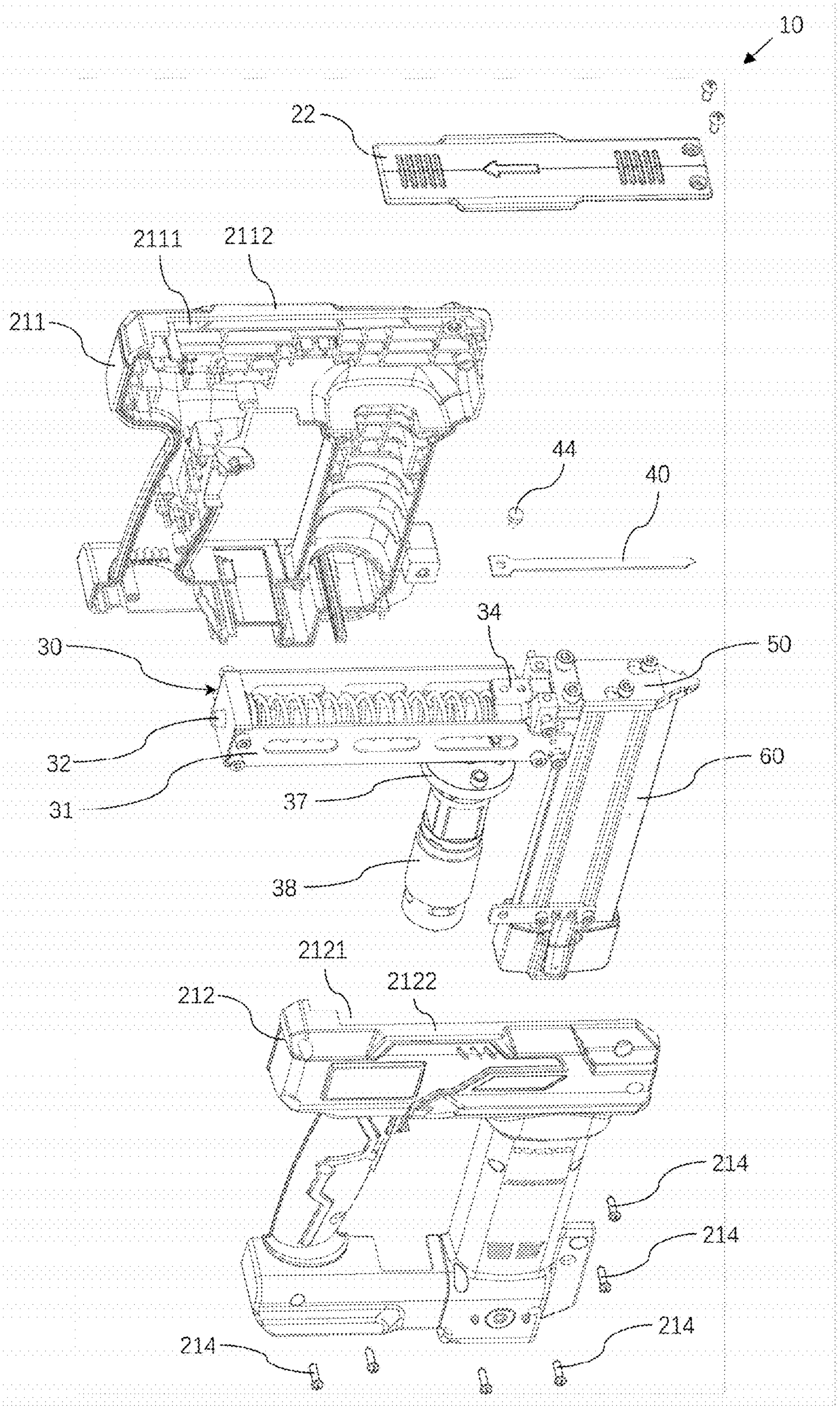
FIG. 2 shows schematically an exploded view of the nail gun shown in FIG. 1.

Referring to FIGS. 1-2, a nail gun 10 is shown according to one embodiment of the invention. In the exemplary embodiment, the nail gun 10 includes a housing 20, a striker driving mechanism 30, a striker 40, a muzzle 50 and a nail magazine assembly 60. The housing 20 is configured to accommodate the above-mentioned internal components such as the striker driving mechanism 30, the striker 40, and the nail magazine assembly 60. The striker driving mechanism 30 is configured to drive the striker 40 to move in a predetermined reciprocating direction.

The nail gun 10 also includes internal components such as a battery and a control circuit (not shown) installed in the housing 20.

Figure 3:
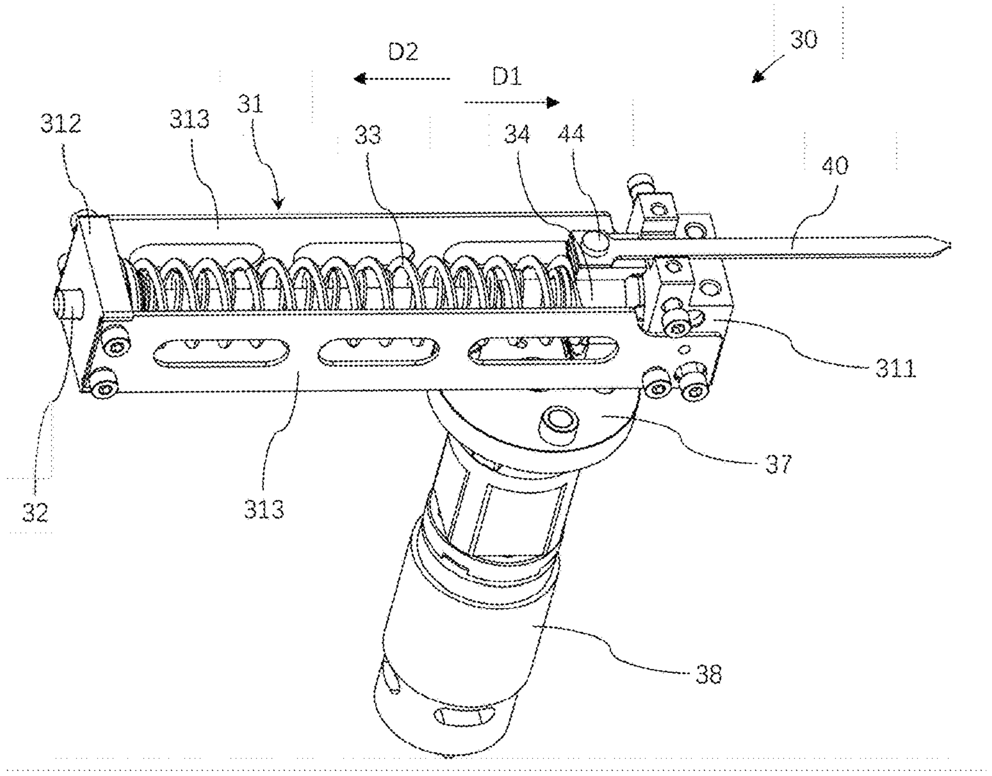
FIG. 3 shows schematically a perspective view of a striker driving mechanism and a striker according to one embodiment of the invention.
Figure 4:
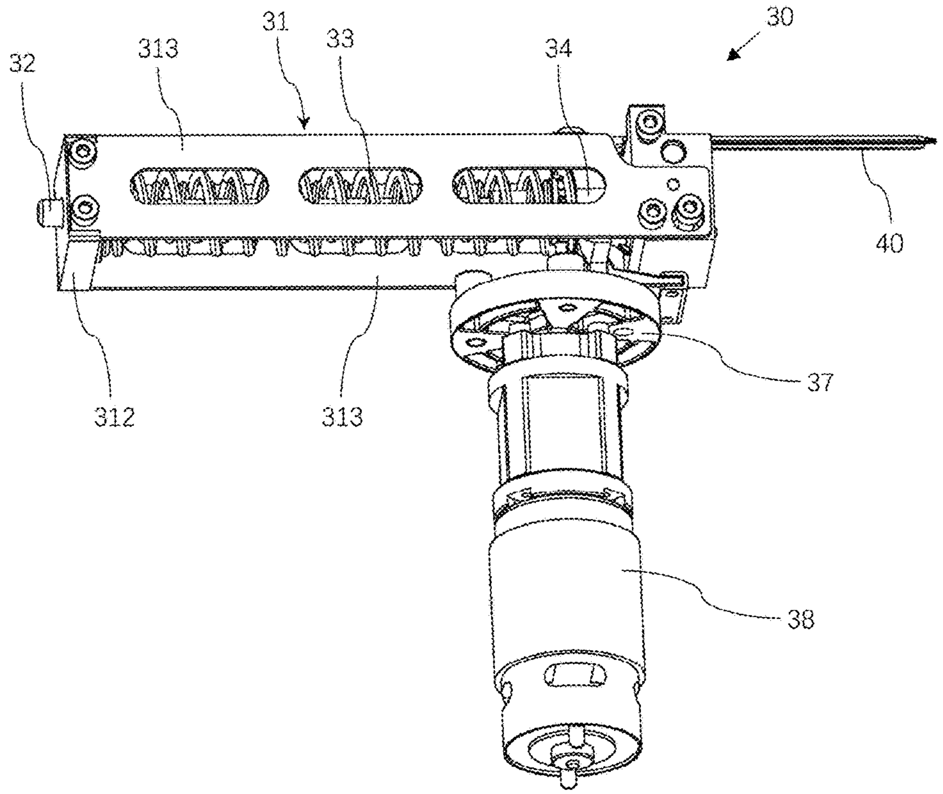
FIG. 4 shows schematically another perspective view of the striker driving mechanism and the striker shown in FIG. 3.
Figure 5:
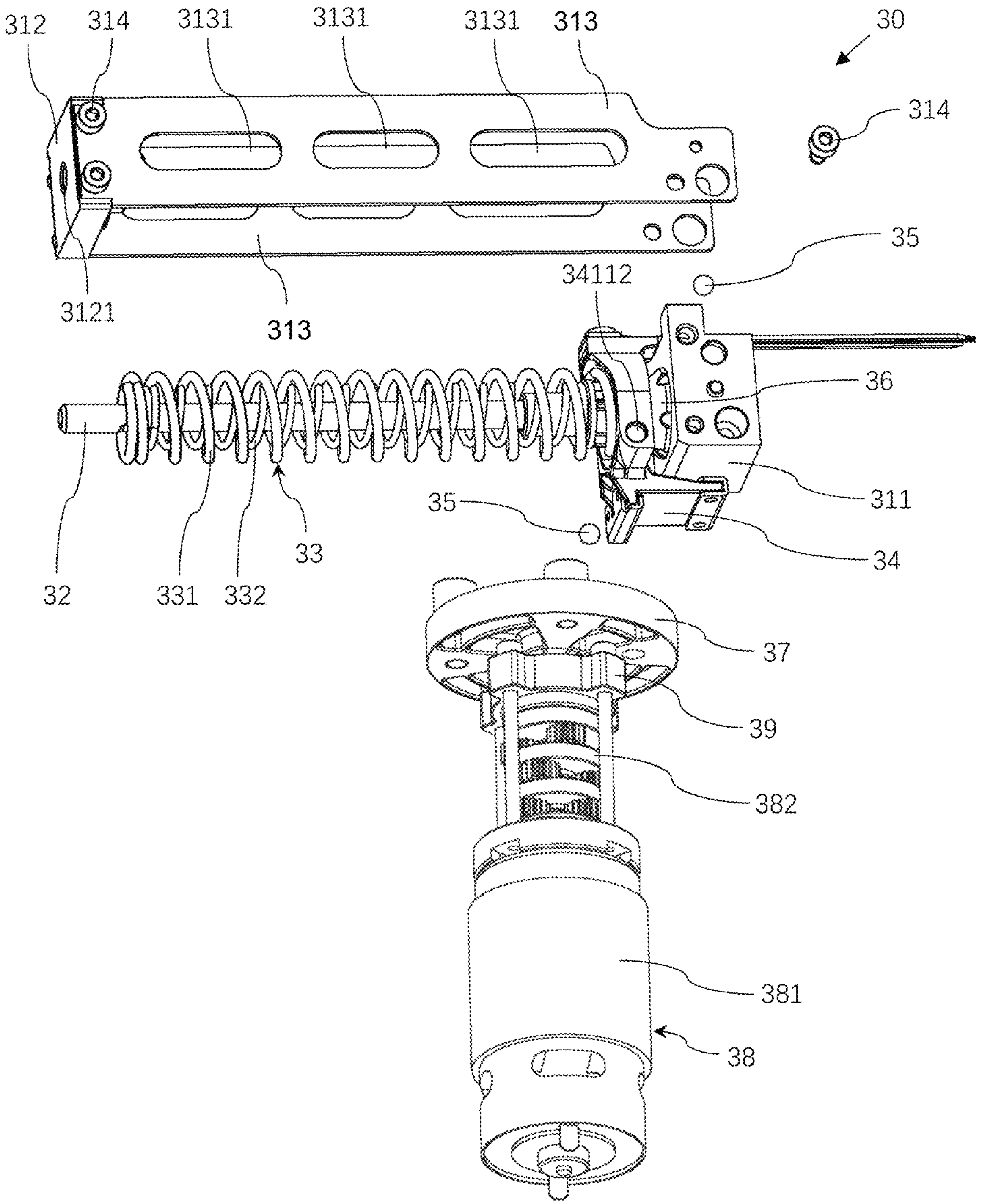
FIG. 5 shows schematically an exploded view of the striker driving mechanism shown in FIG. 3.

Referring to FIGS. 3-5, in one embodiment, the striker driving mechanism 30 includes a frame structure 31, a guide rod 32, a spring assembly 33, a piston 34, a pair of rolling elements 35, buffer pieces 36, a pushing member 37, a driving motor 38, and a one-way bearing 39.

The frame structure 31, also called a regulating frame 31 hereinafter in the disclosure, is configured to regulate and limit the piston 34 so that the piston 34 can only move along the predetermined reciprocating motion direction. The reciprocating motion direction include a nail firing direction and an energy storage direction. As shown in FIG. 3, the direction indicated by the arrow D1 is the nail firing direction, and the direction indicated by the arrow D2 is the energy storage direction. The length direction of the regulating frame 31 is coincident with the reciprocating motion direction. The regulating frame 31 has a limiting base 311, a limiting plate 312 and two regulating plates 313.

The limiting base 311 is configured to limit the movement of the piston 34 during nail firing.

Figure 6:
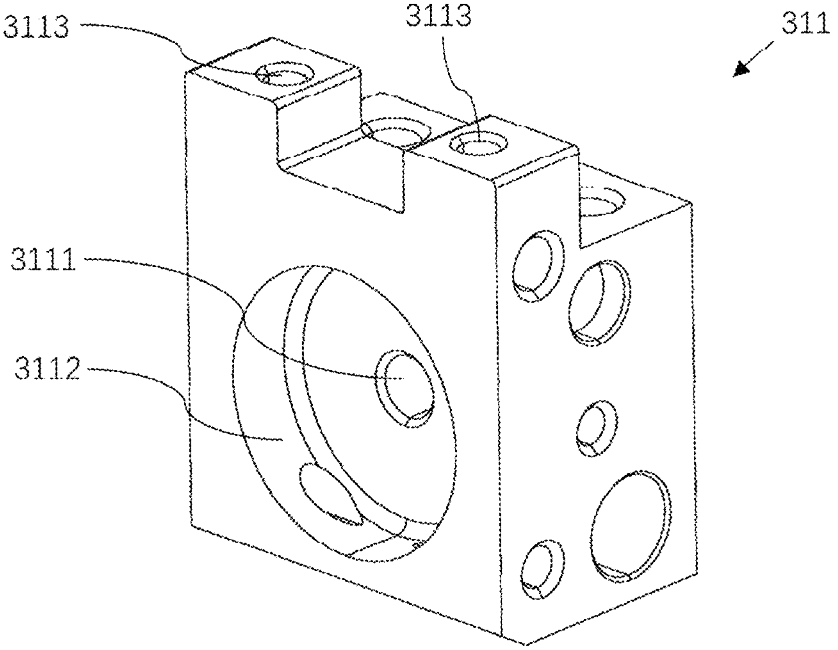
FIG. 6 shows schematically a perspective view of a limiting base according to one embodiment of the invention.

FIG. 6 shows schematically a structural view of the limiting base 311 according to one embodiment of the invention.

In the exemplary embodiment shown in FIG. 6, the limiting base 311 has a certain thickness, so it can withstand the impact of the piston 34 during nail firing without deformation. The middle portion of the limiting base 311 has a guide rod mounting hole 3111 and a buffer embedding recess 3112 connected with the guide rod mounting hole 3111 for accommodating a buffer piece therein. The guide rod mounting hole 3111 is a circular through hole matching the guide rod 32 and is configured to fixedly receive the guide rod 32. The buffer embedding recess 3112 is a circular groove that matches the buffer piece 36 and is configured to fixedly receive the buffer piece 36. The limiting base 311 also has a plurality of mounting holes, used to detachably install the striker baffle plate 22 and the regulating plate 313, respectively.

The limiting plate 312 is configured to limit the piston 34 and the spring assembly 33. The middle portion of the limiting plate 312 has a circular limiting through hole 3121 that matches the guide rod 32 for installing the guide rod 32, and the diameter of the limiting through hole 3121 is larger than the diameter of the guide rod 32, so that the guide rod 32 movably installed on the limiting plate 412.

The regulating plate 313 is configured to regulate the movement direction of the piston 34. The two regulation plates 313 are arranged in parallel, and both extend along the length direction of the regulating frame 31. Each regulation plate 313 is provided with three relief holes 3131 for reducing structural weight. It should be noted that other number, e.g., one, two, four, etc., of lightening holes can also be utilized to practice the invention.

The limiting base 311 and the limiting plate 312 are both arranged perpendicular to the regulating plate 313, and the ends of the limiting base 311 and the limiting plate 312 are respectively connected to the ends of the two regulating plates 313 and are fastened by multiple frame fasteners 314. The frame fasteners 314 are fastened to form an open square frame. In one embodiment, the frame fasteners 314 are screws that match corresponding mounting holes.

The guide rod 32 is configured to guide the piston 34 to move in the predetermined reciprocating direction. The guide rod 32 is a circular rod with uniform thickness along its length. One end of the guide rod 32 is fixedly installed in the middle of the limiting base 311 through the guide rod mounting hole 3111, and the other end of the guide rod 32 is movably installed on the middle portion of the limiting plate 312 through the limit through hole 3121.

The spring assembly 33 is configured to provide power/force for nail firing. The spring assembly 33 in the exemplary embodiment includes a first force supply spring 331 and a second force supply spring 332, both of which are sleeved on the guide rod 32 and have one end in contact with the limiting plate 312 and the other end in contact with the piston 34. In one embodiment, the diameter of the first force supply spring 331 is larger than the second force supply spring 332, and the helical directions of the first force supply spring 331 and the second force supply spring 332 are aligned opposite to each other. When they are sleeved on the guide rod 32, the first force supply spring 331 is on the outer layer, and the second force supply spring 332 is on the inner layer. It should be noted that other number, e.g., one, three, four, etc., of force supply springs can also be utilized to practice the invention.

Figure 7:
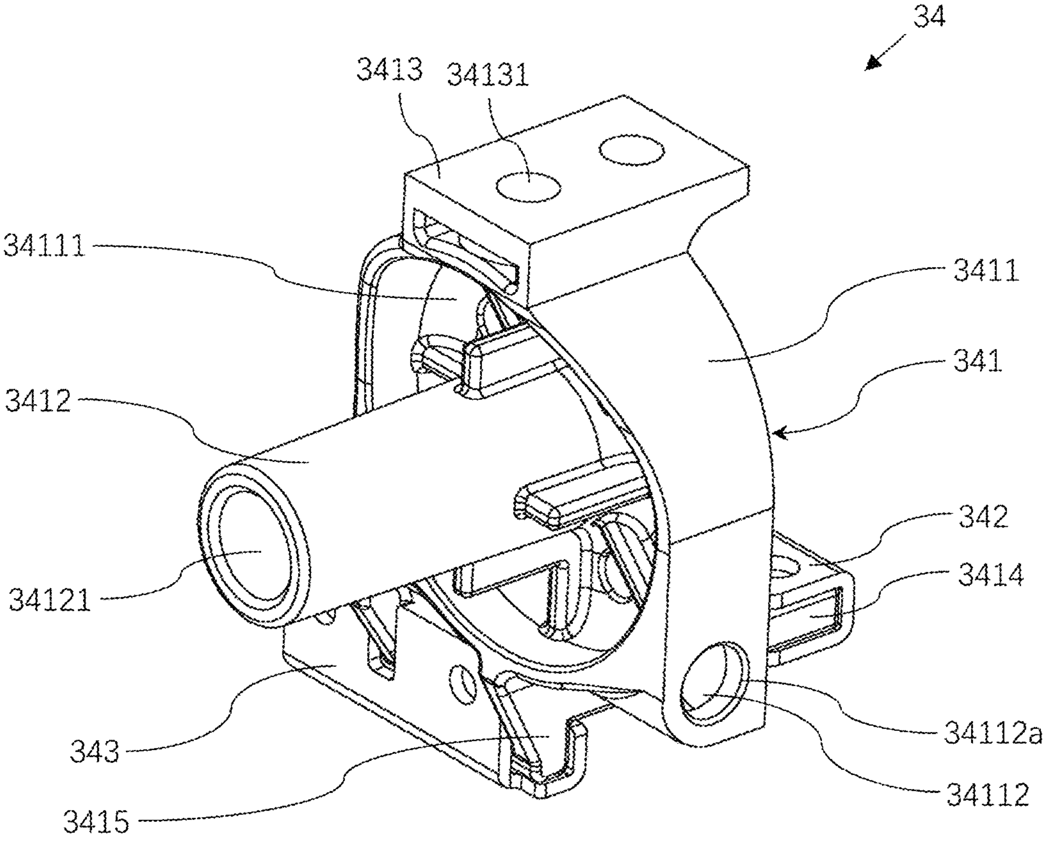
FIG. 7 shows schematically a perspective view of a piston according to one embodiment of the invention.
Figure 8:
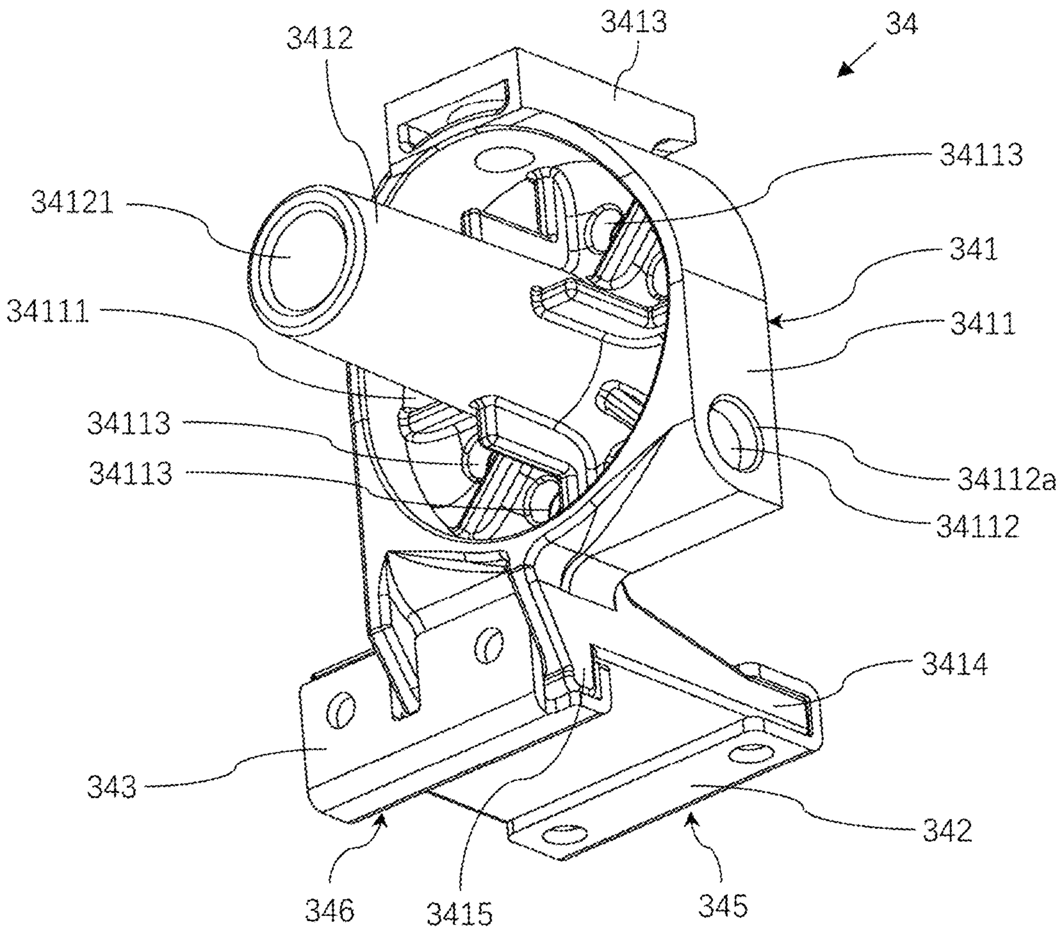
FIG. 8 shows schematically another perspective view of the piston shown in FIG. 7.

As shown in FIGS. 7-8, the piston 34 includes a piston body 341 and a piston protector including a first piston protection member 342 and a second piston protection member 343'

The piston body 341 is made of a lightweight material, such as aluminum in one embodiment, and includes a main body 3411, a sleeve portion 3412, a striker mounting portion 3413, a first thrust portion 3414 and a second thrust portion 3415.

The main body 3411 is configured to compress the first force supply spring 331 and the second force supply spring 332 to drive the striker 40 to move. One side of the main body 3411 has a spring abutting groove 34111 for receiving the ends of the first force supply spring 331 and the second force supply spring 332. The opening direction of the spring abutting groove 34111 faces the spring assembly 33 with the shape matching the end of the first force supply spring 331. Thus, one ends of the first force supply spring 331 and the second force supply spring 332 are abutted against the bottom of the spring abutting groove 34111 and supported by the spring abutting groove 34111, and restrained by the groove walls, so as not to disengage from the piston 34 during compression or release.

The main body 3411 has rolling element embedding grooves (recesses) 34112 on both lateral sides facing the two regulating plates 313 respectively, for accommodating the rolling elements 35. Each rolling element embedding groove 34112 is a round bottom groove that matches the rolling element 35, and the rolling element embedding groove 34112 has a circular groove opening 34112*a*.

Figure 9:
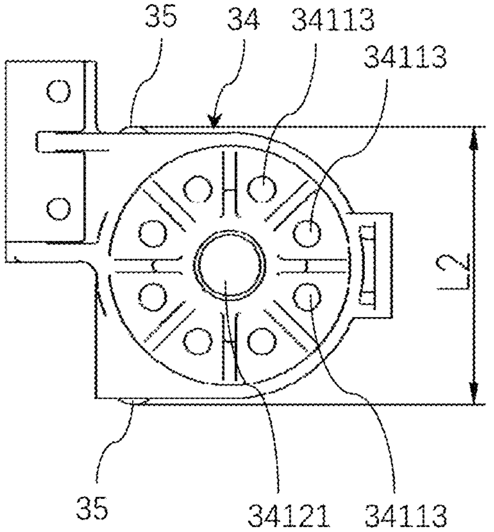
FIG. 9 shows schematically an orthographic projection view of the piston shown in FIG. 7.

As shown in FIG. 9, the main body 3411 is also provided with eight exhausting through holes 34113 for reducing wind resistance when the piston 34 moves. The exhausting through hole 34113 is a circular through hole, and its extending direction is consistent with the extending direction of the sleeve through hole 34121, that is, consistent with the predetermined reciprocating direction. In one embodiment, the eight exhausting through holes 34113 are distributed around the sleeve through hole 34121, and are symmetrically distributed with the central axis of the sleeve through hole 34121 as the center, so that the piston 34 is evenly stressed during the movement. It should be noted that other number and other type of geometrical shapes of exhausting through holes can also be utilized to practice the invention.

The sleeve portion 3412 is provided in the middle of the piston body 3411 and has a sleeve through hole 34121 for connecting the piston 34 to the guide rod 32. The sleeve through hole 34121 is a circular through hole, its diameter is larger than the diameter of the guide rod 32, and the inner wall of the sleeve through hole 34121 is smooth, so that the piston 34 can slide along the length direction of the guide rod 32 after being sleeved on the guide rod 32.

As shown in FIG. 7, the striker mounting portion 3413 is provided on the top side of the piston body 341 facing the replacement opening 213 and has one or more striker mounting hole 34131 matching the striker fixing member for detachably installing the striker 40 thereon.

The first thrust portion 3414 and the second thrust portion 3415 are configured to cooperate with the pushing member 37 to push the piston 34 toward the energy storage direction. The first thrust portion 3414 and the second thrust portion 3415 are both disposed on the bottom side of the piston body 341 close to the pushing member 37. The first thrust portion 3414 extends from the piston body 341 toward the nailing direction, the second thrust portion 3415 extends from the piston body 341 toward the pushing member 37, and the second thrust portion 3415 is substantially perpendicular to the first thrust portion 3414, as shown in FIG. 8.

In one embodiment, the first piston protection member 342 and the second piston protection member 343 are both made of iron material, so they are more wear-resistant and protect the piston body 341. The shape of the first piston protection member 342 matches the first push portion 3414. The first piston protection member 342 covers the first thrust portion 3414 to form the first push end 345. The shape of the second piston protector 343 matches the second thrust portion 3415. The second piston protector 343 covers the second thrust portion 3415 to form the second push end 346.

The first piston protection member 342 and the second piston protection member 343 are both fixedly installed on the piston body 341 through corresponding fasteners (not shown). In one embodiment, the fasteners are screws.

Each rolling element 35 is configured to reduce the friction experienced by the piston 34 during its movement. In one embodiment, the rolling element 35 is a steel ball, which is spherical and has a diameter smaller than the groove opening 34112*a*. Therefore, the rolling element 35 can be installed into the rolling element embedding groove 34112 through the groove opening 34112*a* and is in contact with the rolling element embedding groove 34112. The rolling element 35 is capable of rolling. In one embodiment, the diameter of the rolling element 35 is greater than the depth of the rolling element embedding groove 34112. When the rolling element 35 is embedded in the rolling element embedding groove 34112, the rolling element 35 is protruded outward from the rolling element embedding groove 34112.

Figure 10:
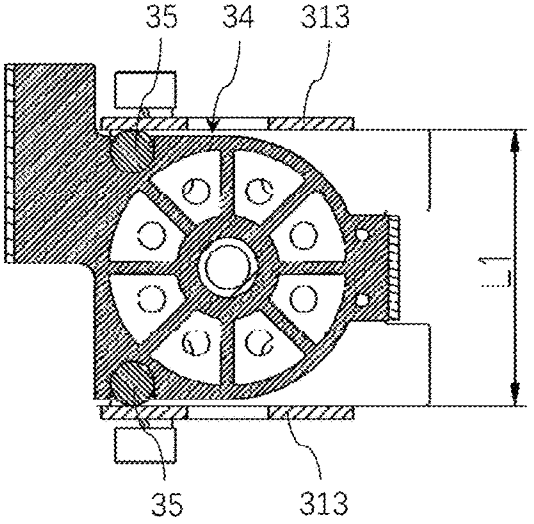
FIG. 10 shows schematically a sectional view of the piston shown in FIG. 7.
Figure 11:
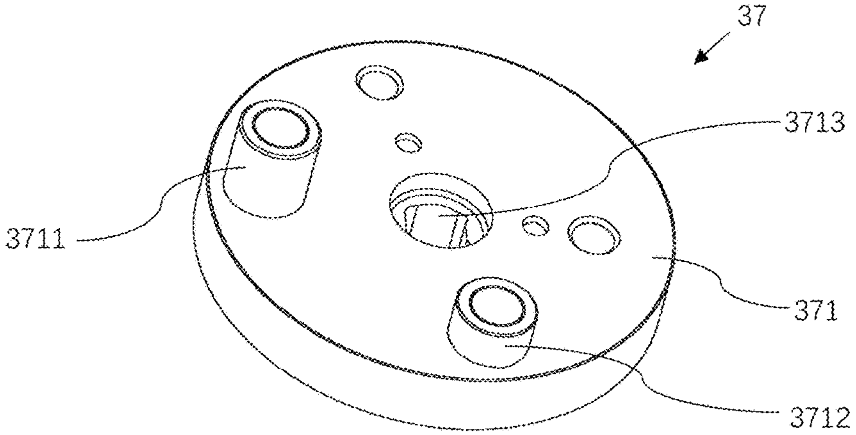
FIG. 11 shows schematically a perspective view of a pushing member according to one embodiment of the invention.

As shown in FIGS. 9 and 10, L2 is the overall width of the piston 34 after the rolling element 35 is installed, and L1 is the distance between the two regulating plates 313. When the piston 34 is installed in the frame structure 31, the two rolling elements 35 are respectively rollably fitted in the two rolling element embedding grooves 34112 and are in contact with the corresponding sides of the two regulating plates 313, and the inner surface of the piston 34. Since the rolling element 35 protrudes outward from the rolling element embedding groove 34112, there is a certain distance between the regulating plate 313 and the piston 34, that is, L1>L2. The two regulating plates 313 are not in contact with the piston 34 directly, thereby reducing the friction experienced by the piston 34 during the movement. In addition, the three relief holes 3131 on the regulation plates 313 are all opened at positions outside the rolling path of the rolling element 35, so the provision of the relief holes 3131 does not affect the regulation function of the regulation plates 313.

The buffer member 36 is configured to buffer the impact of the piston 34 during nail firing, thereby protecting the limiting base 311 and the piston 34. Meanwhile, the buffer member 36 can also reduce the rebound force of the piston 34. In one embodiment, the buffer member 36 is a soft plastic buffer pad, which is installed in the buffer embedding recess 3112 of the limiting base 311, and the thickness of the buffer member 36 is greater than the depth of the buffer embedding recess 3112. Therefore, the buffer member 36 after installation protrudes outward from the buffer member embedding recess 3112, so that when the nail is fired, the piston 34 does not directly hit the limiting seat 311. In addition, the middle portion of the buffer member 36 also has a through hole matching the guide rod 32, so the arrangement of the buffer member 36 does not affect the installation of the guide rod 32.

The pushing member 37 is configured to push the piston 34 to move toward the spring assembly 33, that is, move toward the energy storage direction, thereby compressing the first force supply spring 331 and the second force supply spring 332 to store energy therein.

As shown in FIGS. 3-5 and 11-12, the pushing member 37 in the exemplary embodiment is a cam, having a wheel body 371, a first pushing protrusion 3711 and a second pushing protrusion 3712, that is, the cam has two pushing ends for pushing the two thrust ends of piston 34.

The wheel body 371 can rotate along its central axis to cause the first pushing protrusion 3711 and the second pushing protrusion 3712 to move in an arc-shaped path, thereby pushing the piston 34 to move accordingly. The wheel body 371 has a pivot hole 3713 defined in the middle. The wheel body 371 is mounted to the output end of the drive motor 38 through the pivot hole 3713 and rotates with the output end as the axis. The wheel body 371 is also provided with a plurality of grooves to reduce weight, thereby reducing energy consumption.

The first pushing protrusion 3711 and the second pushing protrusion 3712 are formed on the side of the wheel body 371 facing the piston 34. The first pushing protrusion 3711 and the second pushing protrusion 3712 are both cylindrical, and their extension directions are consistent with the extending direction of the pivot hole 3713, and the height of the first pushing protrusion 3711 is higher than that of the second pushing protrusion 3712.

The shape and height of the first pushing protrusion 3711 correspond to the setting of the first thrust end 345 of the piston 34, and the shape and height of the second pushing protrusion 3712 correspond to the setting of the second thrust end 346 of the piston 34.

Figure 12:
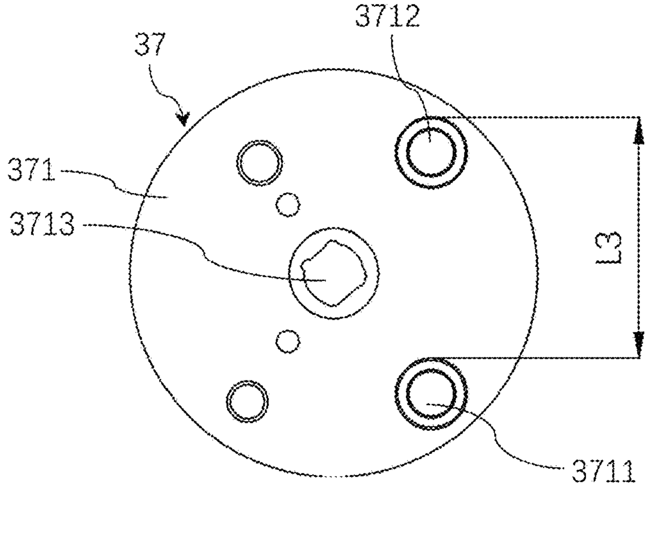
FIG. 12 shows schematically an orthographic projection view of the pushing member shown in FIG. 11.
Figure 13:
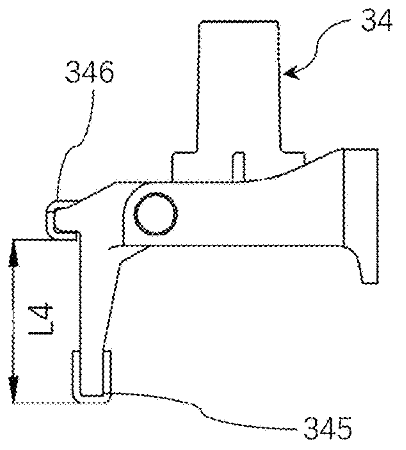
FIG. 13 shows schematically an orthographic projection view of the piston shown in FIG. 7.

As shown in FIGS. 12-13, L3 is the distance between the first pushing protrusion 3711 and the second pushing protrusion 3712, L4 is the distance between the end surface of the first thrust end 345 and the end surface of the second thrust end 346, L3>L4.

According to the above-disclosed structure, the piston 34 can only move in the predetermined nail firing direction when firing nails, and can cooperate with the pushing member 37, and can also move only in the predetermined energy storage direction when the spring assembly 33 is storing energy.

Figure 14:
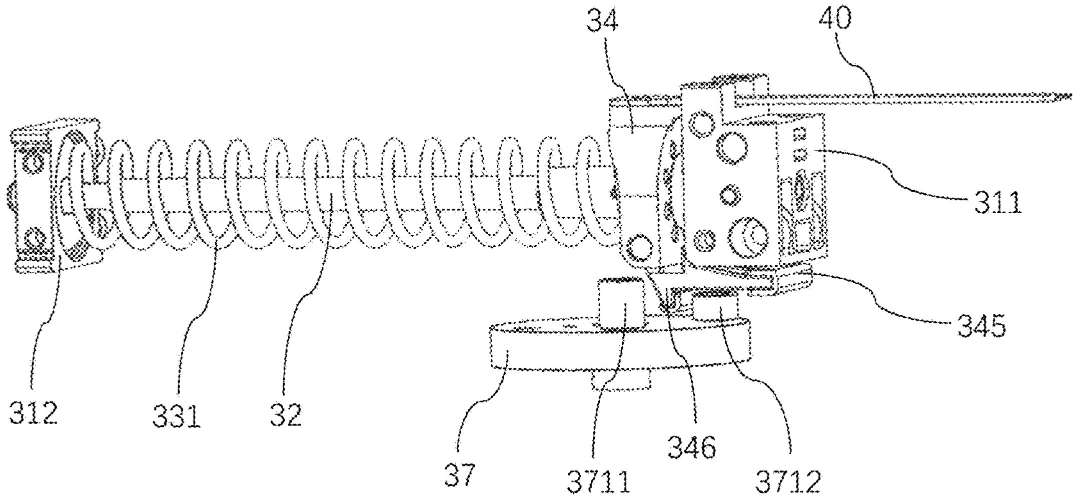
FIG. 14 shows schematically a perspective view of the spring in a first stage of energy storage in which the pushing member cooperates with the piston according to one embodiment of the invention.

As shown in FIG. 14, the pushing member 37 operably rotates under the drive of the driving motor 38. As the pushing member 37 rotates, the second pushing protrusion 3712 moves to the second thrust end 346 and is in contact with the second thrust end 346. At this point, the pushing member 37 continues to rotate. The second pushing protrusion 3712 makes an arc-shaped movement generally toward the direction of energy storage and exerts an arc-shaped pushing force generally toward the direction of energy storage through the second thrust end 346 to the piston 34. The piston 34 can move in the energy storage direction along the guide rod 32 under the action of the driving force and can also perform circular motion around the guide rod 32. Since the piston 34 is in contact with the regulation plate 313 on the corresponding side through the pair of rolling elements 35, the movement direction of the piston 34 is restricted so that it cannot make a circular motion, that is, the piston 34 will not deflect along the width direction of the regulation frame 3 and can only move in the energy storage direction along the guide rod 32, thereby compressing the first force supply spring 331 and the second force supply spring 332 to store energy.

Figure 15:
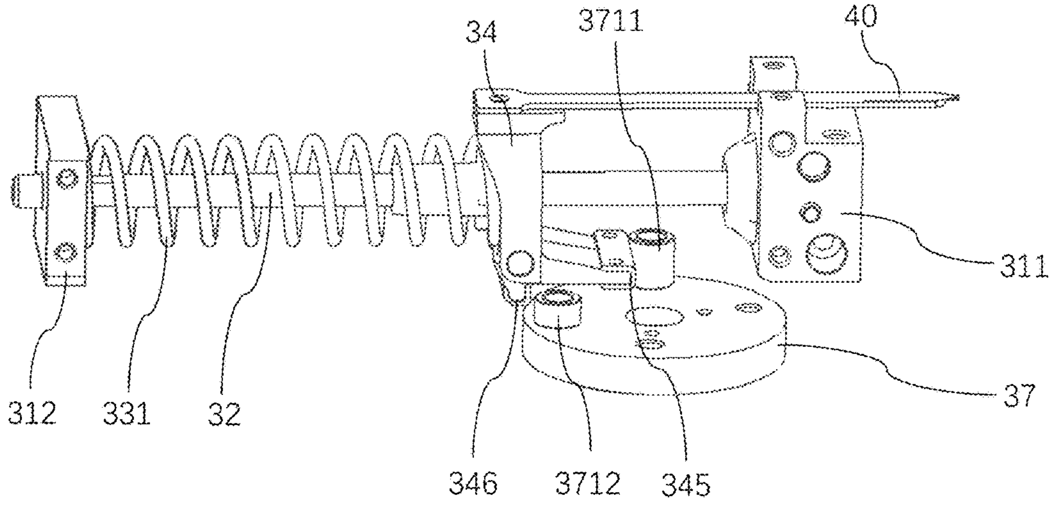
FIG. 15 shows schematically a perspective view of the spring in a second stage of energy storage in which the pushing member cooperates with the piston according to one embodiment of the invention.
Figure 16:
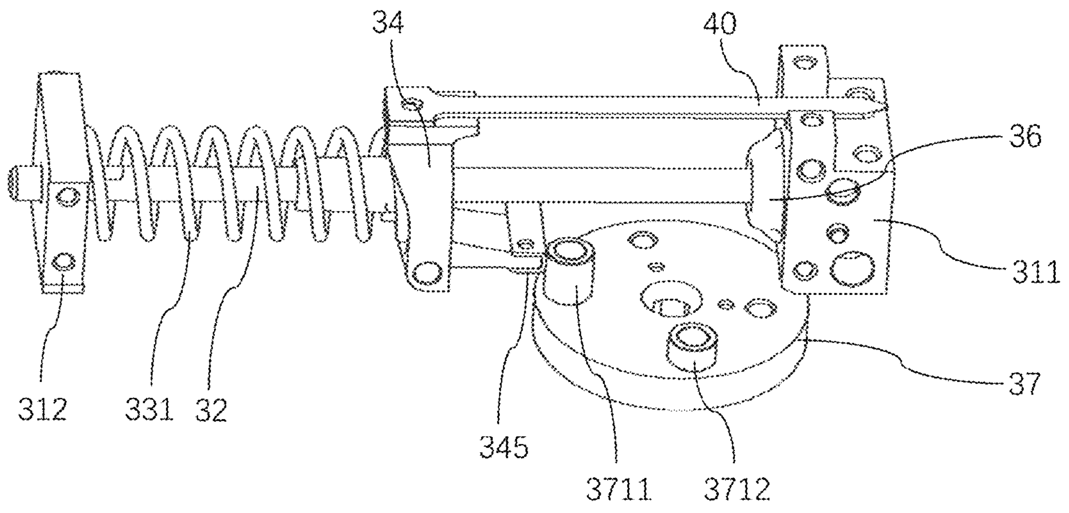
FIG. 16 shows schematically a perspective view of of the piston reaching the maximum stroke according to one embodiment of the invention.

As shown in FIGS. 15-16, the first stage of energy storage is completed when the second pushing protrusion 3712 rotates in the energy storage direction to the maximum stroke. At this point, the pushing member 37 continues to rotate, and the second pushing protrusion 3712 rotates and breaks away from the second thrust end 346. Meanwhile, the first pushing protrusion 3711 rotates to the first thrust end 345 and is in contact with the first thrust end 345, and then the first pushing protrusion 3711 pushes the piston 34 to move further in the energy storage direction in the same way, until the first pushing protrusion 3711 rotates along the energy storage direction to the maximum stroke, completing the second stage of energy storage.

After completing the second stage of energy storage, the nail firing can start. When firing nails, the driving motor 38 drives the pushing member 37 to continue to rotate, and the first pushing protrusion 3711 rotates and breaks away from the first thrust end 345. At this point, the first pushing protrusion 3711 and the second pushing protrusion 3712 are both located outside the movement path of the piston 34, so that the piston 34 moves in the nail-firing direction under the elastic force of the spring assembly 33 until the piston 34 hits the buffer member 36 to complete the nail-firing process.

The driving motor 38 is configured to drive the pushing member 37 to rotate, and then push the piston 34 to move through the pushing member 37.

Figure 17:
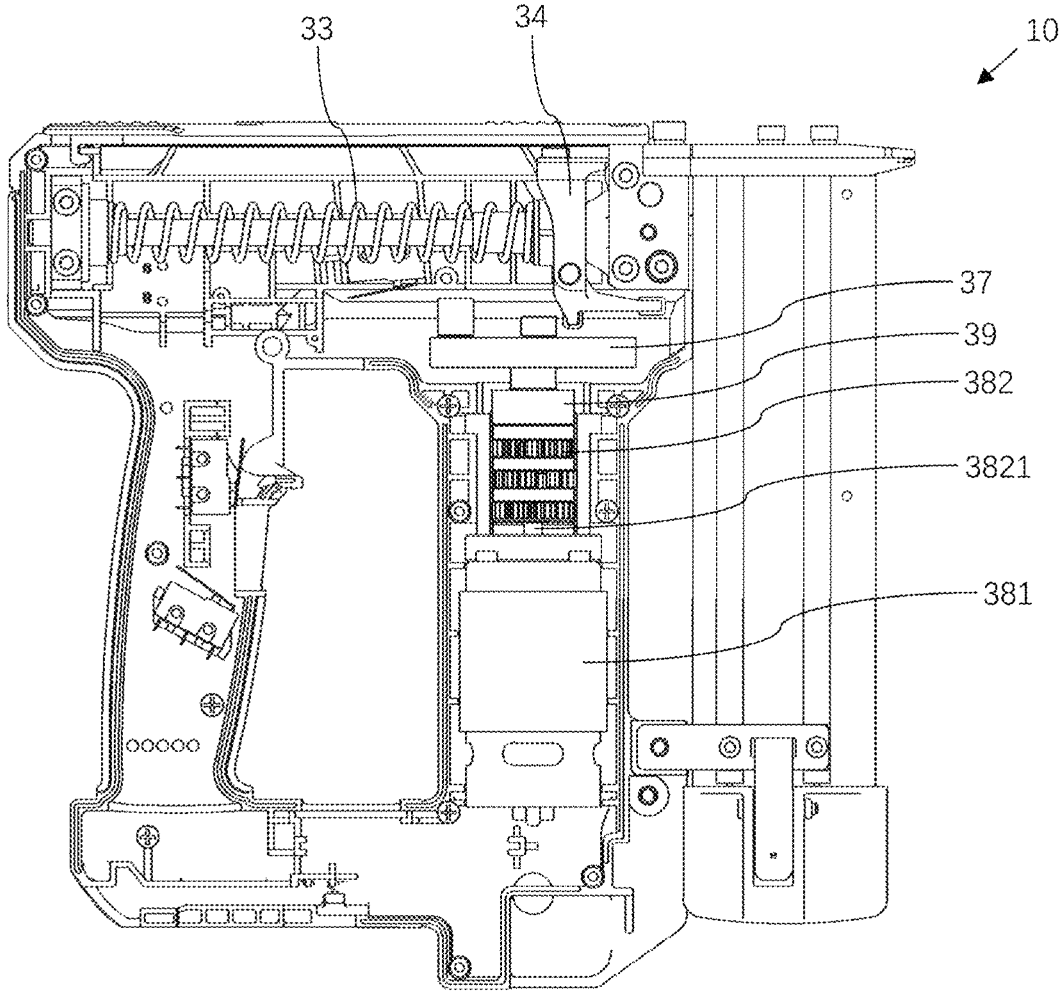
FIG. 17 shows schematically an internal structure diagram of the nail gun according to one embodiment of the invention.

Referring to FIGS. 5 and 17, the drive motor 38 includes a rotating motor 381 and a deceleration and torque increasing unit 382. The deceleration and torque increasing unit 382 is installed at the output end of the rotating motor 381 and is configured to reduce the rotation speed of the output end of the rotating motor 381, thereby obtaining higher output torque, that is, greater driving force. The end of the deceleration and torque increasing unit 382 is provided with an output shaft 3821, which is the output end of the drive motor 38. The wheel body 371 of the pushing member 37 is installed on the output shaft 3821 through the pivot hole 3711, so that the pushing member 37 operably rotates synchronously with the output shaft 3821.

The one-way bearing 39 is configured to limit the rotation direction of the output end of the drive motor 38 in one direction only. The one-way bearing 39 is installed on the output shaft 3821 of the speed reduction and torque increasing unit 382 to form a hole-shaft fitting with the output shaft 3821, so that the output shaft 3821 can only rotate in one direction. At the same time, when the pushing member 37 is pushed by the pushing force of its reverse rotation, the one-way bearing 39 bears the pushing force so that the pushing force is not transmitted to the output shaft 3821, thereby protecting the driving motor 38. Therefore, when performing the first stage of energy storage or the second stage of energy storage, the pushing member 37 will not reversely rotate under the force of the piston 34, resulting in mistaken nail firing.

The rotating motor 381, the deceleration and torque increasing unit 382, and the one-way bearing 39 can be respectively an existing rotating motor, an existing deceleration and torque increasing unit, and an one-way bearing in the art.

The striker 40 is configured to strike the nail, thereby causing the nail to be ejected from the muzzle 50.

Figure 18:
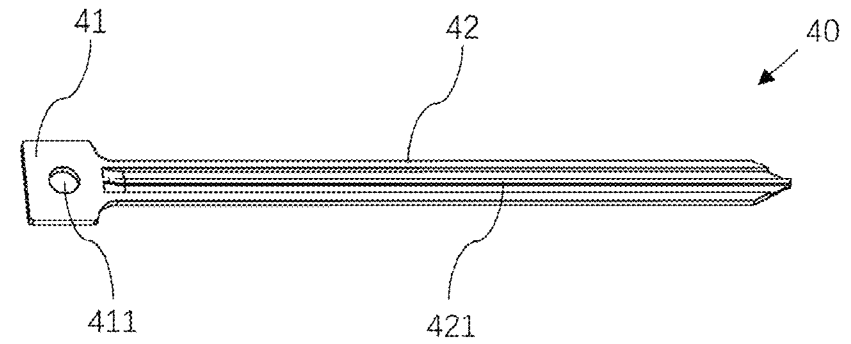
FIG. 18 shows schematically a perspective view of the striker according to one embodiment of the invention.

As shown in FIG. 18, the striker 40 includes a mounting portion 41 and a guide striking portion 42. The mounting portion 41 is configured to mount the striker 40 to the piston 34. In the exemplary embodiment, the mounting portion 41 has a mounting hole 411. During installation, the mounting hole 411 is aligned with the striker mounting hole 34131 on the piston 34, and the striker fixing member 44 passes through the mounting hole 411 and the striker mounting hole 34131 to fix the striker 40 to the piston 34.

The guide striking portion 42 is configured to strike the nail. The guide striking portion 42 extends from the mounting portion 41 and is elongated, with a width narrower than the mounting portion 41. There is a guide groove 421 on one side of the guide striking portion 42, which is configured to regulate the movement direction of the striker 40 during striking for the mail firing.

Figure 19:
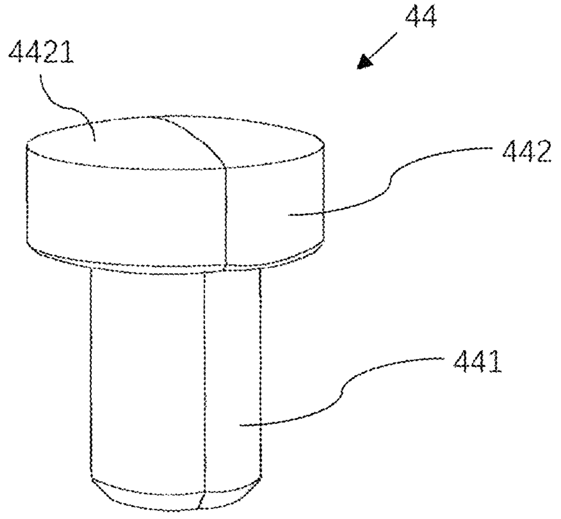
FIG. 19 shows schematically a perspective view of the striker fixing member according to one embodiment of the invention.

In one embodiment shown in FIG. 19, the striker fixing member 44 is a snap-in connector having a cap 442 and a post 441 extending from the cap 442. The post 441 in configured to insert into the mounting hole 411 of the striker 40 and the striker mounting hole 34131 of the piston 34. The post 441 is a cylinder that matches the striker mounting hole 34131. The cap 442 is configured to cooperate with the striker baffle plate 22 to limit the striker 40. The cap 442 is also substantially cylindrical and its diameter is larger than the diameter of the post 441. The cap 442 has a top surface 4421, and the top surface 4421 has a predetermined curvature such that the top surface 4421 protrudes outward. When the striker 40 is installed on the piston 31 and the striker baffle plate 22 is installed on the main body housing 21, the top surface 4421 of the cap 442 abuts against the inner surface of the striker baffle plate 22 facing the striker 40, thereby preventing the striker fixing member 44 from falling off during the reciprocating motion. In addition, the top surface 4421 is arc-shaped, the friction force during the reciprocating motion can be reduced.

In another embodiment, the striker fixing member 44 is a screw.

The muzzle 50 is configured to receive the striker 40 and limit the movement of the striker 40 when the striker 40 strikes the nail.

Figure 20:
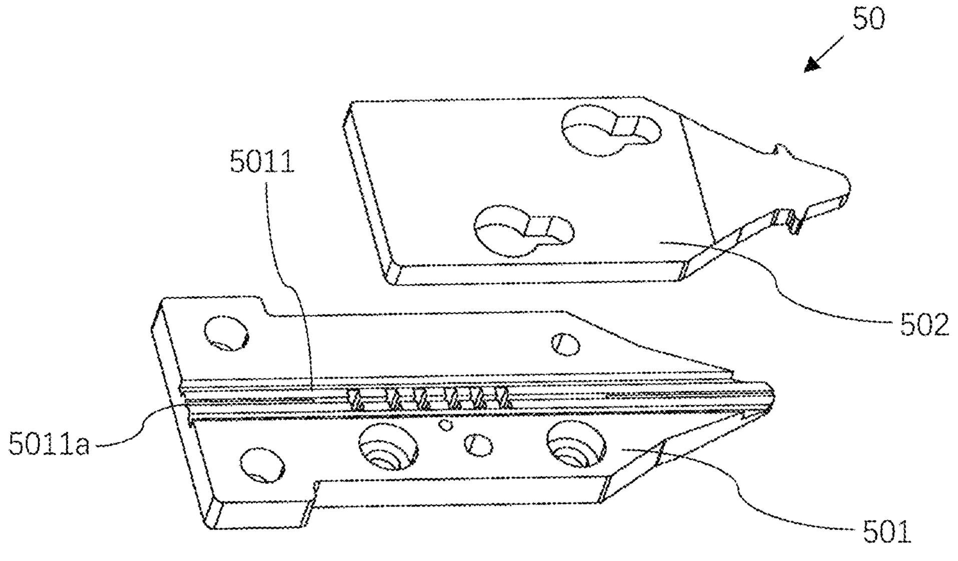
FIG. 20 shows schematically an exploded view of the nozzle according to one embodiment of the invention.

As shown in FIGS. 2 and 20, the muzzle 50 includes a striker accommodating portion 501 and a muzzle cover 502. The striker accommodating portion 501 has a groove defined therein. When the striker accommodating portion 501 and the muzzle cover 502 are installed together, a striker accommodating groove 5011 is formed between said groove and the surface of the muzzle cover 502 facing said groove and configured to accommodate the striker 40. The striker accommodating groove 5011 has an accommodating slot opening 5011*a* and a groove-shaped structure matching the guide groove 421 of the striker 40. Therefore, the guide striking portion 42 of the striker 40 can be inserted into the striker accommodating groove 5011 from the accommodating groove opening 5011*a* and slidably fitted with the striker accommodating groove 5011. The striker 40 can also be taken out from the accommodating groove opening 5011*a*.

According to embodiments of the invention, the striker 40 can be easily and quickly replaced through the striker baffle plates 22 and the accommodating groove opening 5011*a*.

Figure 21:
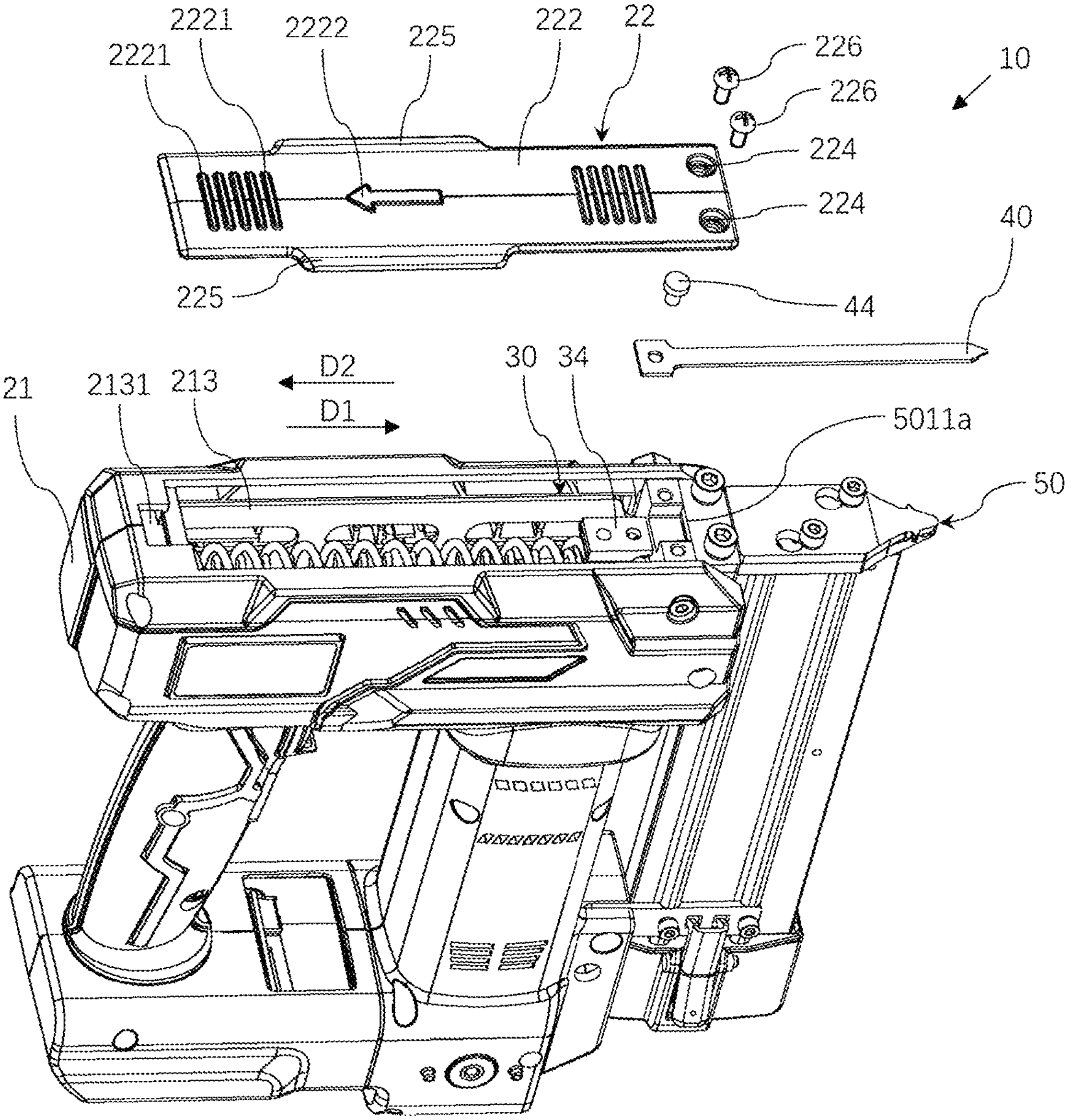
FIG. 21 shows schematically an exploded view of the structure of the nail gun after the striker baffle plate and striker are disassembled, according to one embodiment of the invention.

As shown in FIGS. 2 and 21, in the exemplary embodiment, the housing 20 includes a body casing 21 and a striker baffle plate 22.

The body casing 21 is configured to accommodate the striker driving mechanism 30, the striker 40 and other internal components, and to protect the above-mentioned internal components. As shown in FIG. 2, the body casing 21 includes a left outer casing 211, a right outer casing 212 and a plurality of casing fasteners 214. In addition, in this embodiment, the directions of "left", "right", "upper", and "lower" refer to the left, right, upper, and lower directions based on the direction the operator faces when holding the gun to shoot nails.

The left outer casing 211 and the right outer casing 212 can be installed together to form an integrated main casing 21 and can be fastened by a plurality of casing fasteners 214. In this embodiment, the casing fasteners 214 are screws that match the casing mounting holes on the left outer casing 211 and the right outer casing 212.

The top of the left outer casing 211 has a left casing notch 2111, and the right outer casing 212 has a right casing notch 2121 that matches the left casing notch 2111. When the left outer casing 211 and the right outer casing 212 are installed together, the left shell notch 2111 and the right shell notch 2121 are combined into a replacement opening 213, that is, the body casing 21 has a replacement (maintenance) opening 213 for replacing (maintaining) the striker 40.

The replacement opening 213 is generally rectangular, its length is greater than the length of the striker 40, and its width is greater than the width of the striker 40, so that it is convenient to take the striker 40 from the replacement opening 213. The end of the replacement opening 213 away from the striker 40 has a buckle positioning notch (slot) 2131. At the same time, the projection of the replacement opening 213 on the plane (surface) where the accommodation slot opening 5011 is located covers the accommodation slot opening 5011*a*, that is, the replacement opening 213 completely exposes the accommodation slot opening 5011*a*.

The inner sides of the left outer casing 211 and the right outer casing 212 also have grid-like reinforcing ribs, as well as structures for supporting and fixing internal components such as a motor. It also has a plurality of through holes for heat dissipation and exhaust. The specific structures of the left outer casing 211 and the right outer casing 212 are based on the existing technology and will not be described in detail.

The striker baffle plate 22 is detachably installed on the replacement opening 213. When the striker baffle plate 22 is removed, the replacement opening 213 is exposed, and the striker 40 can be easily replaced through the replacement opening 213. When the striker baffle plate 22 is installed, the body casing 21 and the striker baffle plate 22 form an integrated housing 20, the overall structural strength is higher, and internal components such as the striker driving mechanism 30 and the striker 40 are completely enclosed in the housing 20 to protect these internal components. function, and also protects the operator during the nail firing process.

Figure 22:
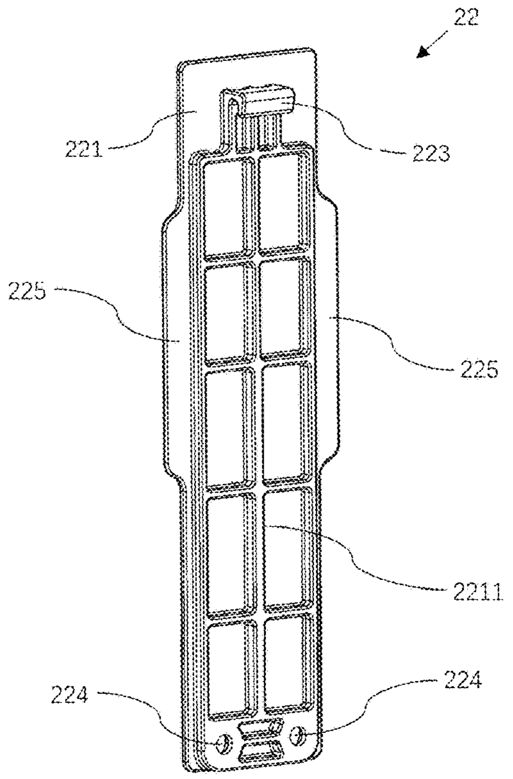
FIG. 22 shows schematically a perspective view of the striker baffle plate according to one embodiment of the invention.

As shown in FIGS. 21-22, in the exemplary embodiment, the striker baffle plate 22 includes an inner side 221 and an outer side 222. When the striker baffle plate 22 is installed on the replacement opening 213, the baffle inner side 221 faces the striker 40. The striker baffle plate 22 also includes a buckle 223, a pair of mounting through holes 224 and a pair of supporting protrusions 225.

The inner side 221 of the striker baffle plate 22 has grid-like reinforcing ribs for strengthening the structural strength of the striker baffle plate 22. The reinforcing ribs are composed of a plurality of convex strips, among which the convex strips 2211 located at the central axis of the striker baffle plate 22 along the length direction also play a limiting role on the striker fixing member 44. When the striker 40 is installed on the piston 34 and the striker baffle plate 22 is installed on the replacement opening 213, the protrusions 2211 on the inner side 221 of the striker baffle plate 22 abut the top surface 4421 of the striker fixing member 44.

Figure 23:
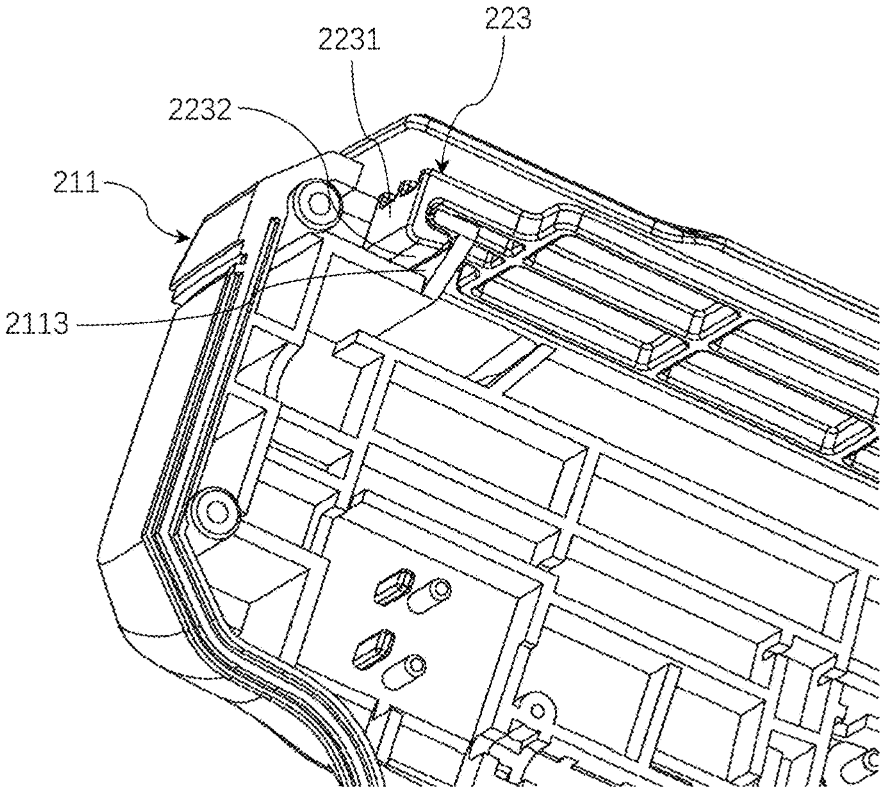
FIG. 23 shows schematically a partially perspective view of the engagement of the striker baffle plate and the housing according to one embodiment of the invention.

As shown in FIGS. 22-23, the buckle 223 is provided on the inner side 221 of the striker baffle plate 22. The buckle 223 matches the slot 2113 of the left outer casing 211. The striker baffle plate 22 and the body casing 21 are engaged with each other through the buckle 223 and the slot 2113, thereby restricting the movement of the striker baffle plate 22 in the nail firing direction.

Specifically, the buckle 223 includes a first extension portion 2231 extending substantially vertically downward from the inner side of the baffle 221 and a second extension portion 2232 extending from an end of the first extension portion 2231 along the length direction of the striker baffle plate 22. The second extension portion 2232 operably extends into the slot 2113 to engage the buckle 223 with the slot 2113. The buckle 223 also matches the buckle positioning notch 2131. During installation, the buckle 223 can be positioned to the predetermined loading position through the buckle positioning gap 2131, that is, the opening of the slot 2113. After aligning the buckle 223 with the buckle positioning notch 2131 and pressing it, push the striker baffle plate 22 along the nail firing direction to engage the buckle 223 with the buckle slot 2113, and push the striker baffle plate 22 along the energy storage direction, the buckle 223 can be separated from the slot 2113.

There is a plurality of anti-skidding protrusions 2211 formed on the outer side 222 of the baffle plate 22, which are configured to increase friction when pushing the striker baffle plate 22 to engage or disengage the buckle 223. The plurality of anti-skidding protrusions 2211 are arranged in the above-mentioned reciprocating direction and are evenly spaced, and the length direction of each anti-skidding protrusion 2211 is perpendicular to the reciprocating direction. There is also an arrow-shaped indicator protrusion 2212 on the outer side 222 of the baffle plate 22, indicating the direction of force when removing the striker baffle plate 22. Pressing the anti-skidding protrusion 2211 on the striker baffle plate 22 and pushing the striker baffle plate 22 in that direction disengages the buckle 223 from the slot 2113, thereby removing the striker baffle plate 22.

The mounting through hole 224 is configured to mount the striker baffle plate 22 to the striker drive mechanism 30. The two baffle fasteners 226 respectively pass through the two installation through holes 224 of the striker baffle plate 22 and the two baffle mounting holes 3113 on the limit base 311, and secure one end of the striker baffle plate 22 to the limit base 311. The installation through hole 224 and the buckle 223 are respectively provided on two sides of the striker baffle plate 22 along the length direction, where the installation through hole 224 is provided on the side close to the striker 40.

The support protrusions 225 of the striker baffle plate 22 are configured to support the striker baffle plate 22 after the striker baffle plate 22 is installed on the body casing 21 to prevent the striker baffle plate 22 from being stuck in the replacement opening 213 due to force. The pair of supporting protrusions 225 are respectively located on two sides of the striker baffle plate 22 along its width direction, and the shape and position of the pair of supporting protrusions 225 are respectively the same as those of a pair of supporting protrusions, i.e., the above-mentioned left supporting protrusions 2112 and the right supporting protrusion 2122, of the body casing 21 (FIG. 2). After the striker baffle plate 22 is installed on the body casing 21, the pair of supporting protrusions 225 respectively abuts against the pair of supporting protrusions 2112 and 2122 of the body casing 21.

After the striker baffle plate 22 is removed, the replacement opening 213 is exposed, and the mounting portion 41 of the striker 40 and the corresponding striker fixing member 44 are exposed from the replacement opening 213. At this point, the striker fixing member 44 can be easily pulled out and removed, so as to replace the striker 40. After the striker 40 is removed, the accommodating groove opening 3311 is exposed from the replacement opening 213. At this point, a new striker 40 can be easily installed. Specifically, a user can insert the new striker 40 into the striker accommodating groove 5011 through the accommodating groove opening 5011*a*, and align the mounting hole 411 of the striker 40 with the striker mounting hole 34131 on the piston 34, and then insert the striker fixing member 44 into the mounting hole 411 and the striker mounting hole 34131 and press it tightly, to complete the installation of the new striker 40.

After the new striker 40 is installed, the striker baffle plate 22 can be installed again, and the body casing 21 and the striker baffle plate 22 form a complete casing (housing) 20.

As shown in FIG. 21, when the striker driving mechanism 30 is installed in the housing 20, the direction and position of the opening of the regulating frame 31 also correspond to the replacement opening 213. Therefore, after the striker baffle plate 22 is removed, the use can also, through the replacement opening 213 and the opening of the regulating frame 31, to inspect or examine the piston 34, the spring assembly 33, etc., in the regulating frame 31.

The nail magazine assembly 60 is configured to send multiple nails to the gun nozzle 50 in sequence, and then the striker driving mechanism 30 drives the striker 40 to impact and eject the nails at the gun nozzle 50. The specific structure of the nail magazine assembly 60 is an existing technology and will not be described again here.

As disclosed above, according to embodiments of the invention, the striker driving mechanism 30 and the nail gun 10 are formed with a composite structure and a lightweight piston 34, and the striker driving mechanism 30 is formed with a low-resistance structure such as a rolling element 35. Therefore, the nail gun can operably reduce the energy consumption and effectively improve the nail firing power accordingly.

In one embodiment, the structure of the piston body is the same as that shown in FIGS. 7-8, but the piston protection member is protective coating and made of different materials.

For example, the piston body 341 is made of aluminum, and the protective coating is made of titanium, which is coated on the first thrust portion 3414 and the second thrust portion 3415, respectively. The coating areas correspond to the areas covered by the first piston protection member 342 and the second piston protection member 343 of the piston protector shown in FIGS. 7-8.

Other structures and corresponding working principles of this embodiment of the invention are the same as those disclosed above and will not be repeated herein.

Figure 24:
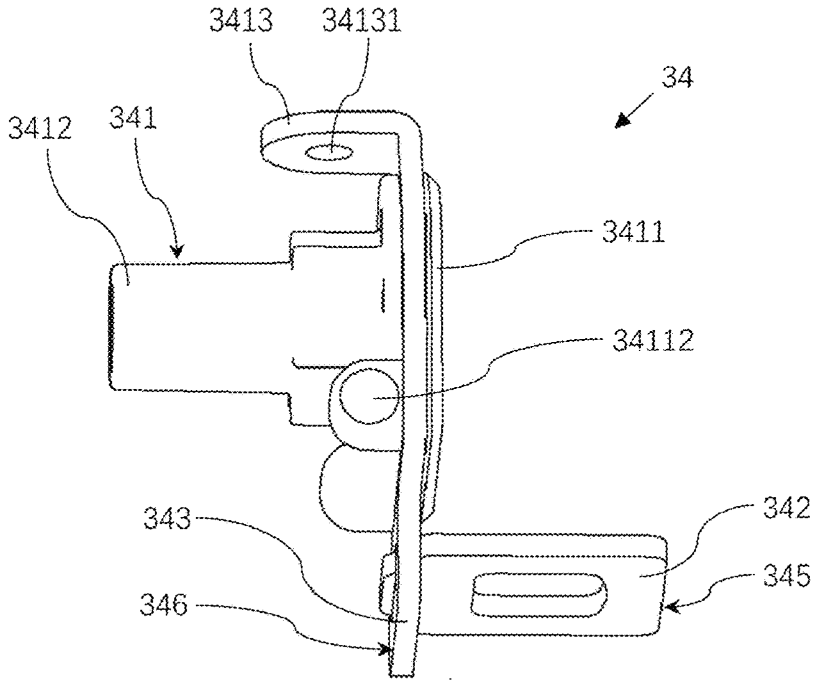
FIG. 24 shows schematically a perspective view of the piston according to one embodiment of the invention.
Figure 25:
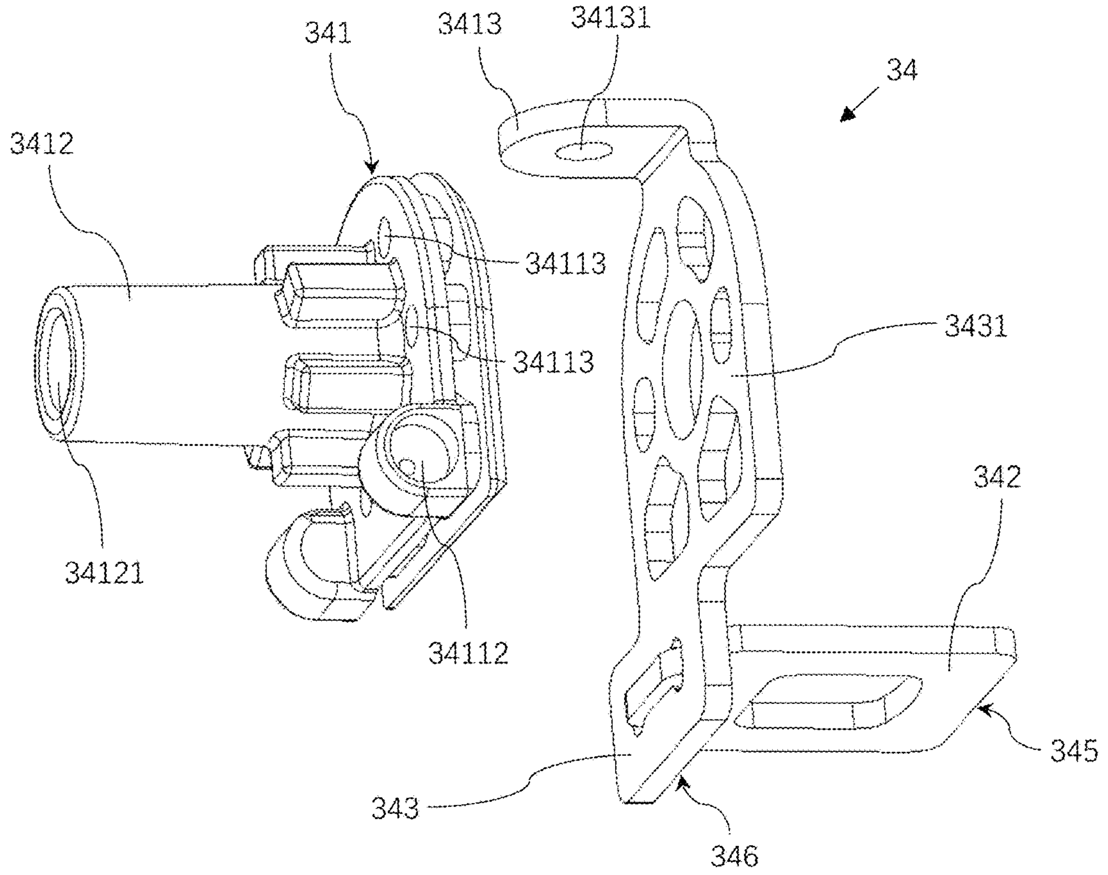
FIG. 25 shows schematically another perspective view of the piston according to one embodiment of the invention.

Referring to FIGS. 24-25, the piston is schematically shown in another embodiment of the invention. Compared with one embodiment of the piston shown in FIGS. 7-10, the difference is that the piston shown in FIGS. 24-25 is made of different materials and can be produced through different production methods.

In the exemplary embodiment shown in FIGS. 24-25, the piston 34 includes a piston body 341, a first piston protection member 342 and a second piston protection member 343. The piston body 431 is made of plastic material, and the first piston protection part 342 and the second piston protection part 343 are made of iron material. The production method is to cast plastic onto iron components through corresponding molds, thereby forming an iron-plastic composite integrated piece.

As shown in FIG. 25, the second piston protector 343 has a protector connecting portion 3431 with a plurality of irregularly shaped through holes. When pouring, the molten plastic flows through these through holes, thereby after cooling and molding, a firm fitting structure is formed between the piston body 431 and the second piston protector 343. In addition, the striker mounting portion 3413 is also formed on the second piston protector 343.

After the integrated piston 34 is formed in the above manner, the structure and function of the piston 34 of the embodiment are consistent with that of the piston 34 shown in FIGS. 7-10.

Other structures and corresponding working principles of this embodiment of the invention are the same as those disclosed above and will not be repeated herein.

Figure 26:
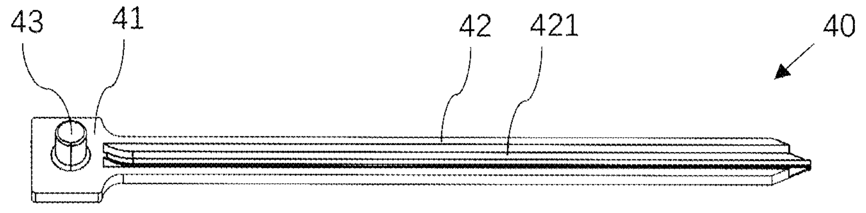
FIG. 26 shows schematically a perspective view of the striker according to one embodiment of the invention.

Referring to FIG. 26, the striker 40 is shown according to one embodiment of the invention, wherein the striker 40 includes a mounting portion 41 having a post 43 protruded from the mounting portion 41. The mounting post 43 is corresponding to the striker mounting hole 34131 of the piston 34 (FIG. 25). When assembling, the mounting post 43 is inserted into the striker mounting hole 34131 on the piston 34, to fix the striker 40 to the piston 34. When disassembling, the mounting post 43 is taken out from the striker mounting hole 34131 on the piston 34, to separate the striker 40 from the piston 34.

Referring to FIGS. 27-32, the striker 40 and the piston 34 and the assembling and disassembling procedures thereof are shown according to another embodiment of the invention.

Figure 27:
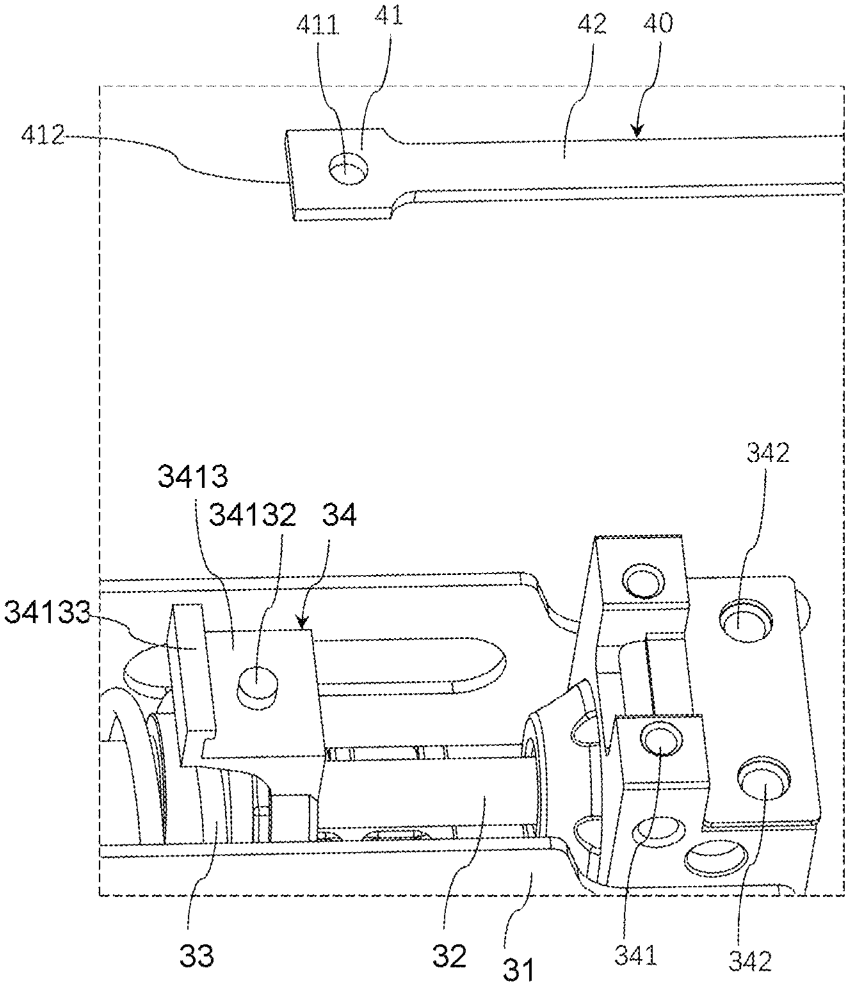
FIG. 27 shows schematically a partially exploded view of the striker and the piston according to one embodiment of the invention.
Figure 31:
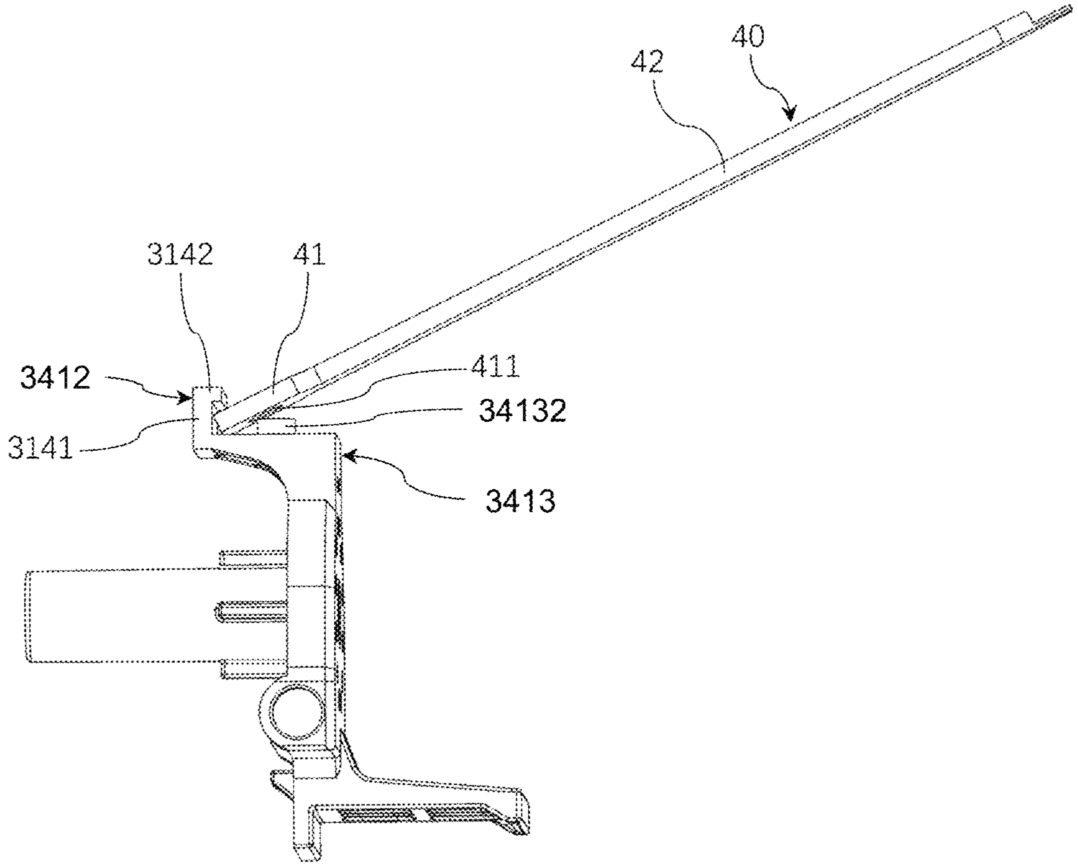
FIG. 31 shows schematically a perspective view of the striker being attached on the piston according to one embodiment of the invention.
Figure 32:
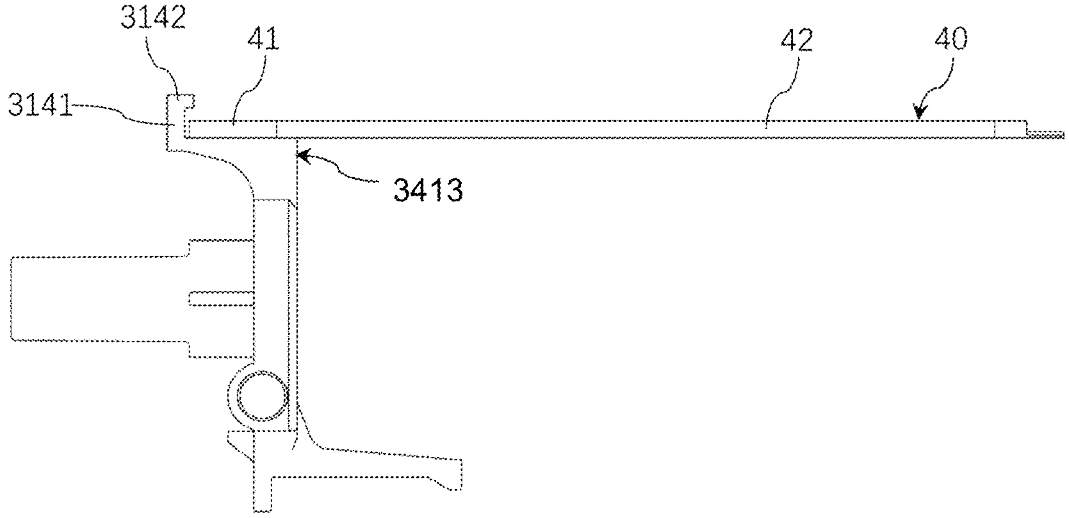
FIG. 32 shows schematically a side view of the striker attached on the piston according to one embodiment of the invention.

As shown in FIG. 27, the striker mounting portion 3413 of the piston 34 has a limiting portion 34133 vertically extending from an edge of the striker mounting portion 3413. The striker mounting portion 3413 of the piston has one post 34132 protruded from the striker mounting portion 3413, and the mounting portion 41 of the striker 40 has one mounting hole 411 corresponding to the post 34132 on the striker mounting portion 3413. When assembling, the post 34132 of the striker mounting portion 3413 of the piston 34 is snapped and received in the mounting hole 411 of the mounting portion 41 of the striker 40, and the mounting portion 41 of the striker 40 abuts against the limiting portion 34133 of the striker mounting portion 3413 of the piston 34, as shown in FIGS. 31-32. The striker 40 is securely installed onto the piston 34.

In another embodiment, the striker mounting portion 3413 of the piston 34 has one mounting hole (e.g., 34131 shown in FIG. 25), and the mounting portion 41 of the striker 40 has one post 43 (FIG. 26) corresponding to the mounting hole on the striker mounting portion 3413. When assembled, the post 43 of the mounting portion 41 of the striker 40 is snapped and received in the mounting hole of the striker mounting portion 3413 of the piston 34, and the mounting portion 41 of the striker 40 abuts against the limiting portion 34133 of the striker mounting portion 3413 of the piston 34. The striker 40 is securely installed onto the piston 34.

Figure 28:
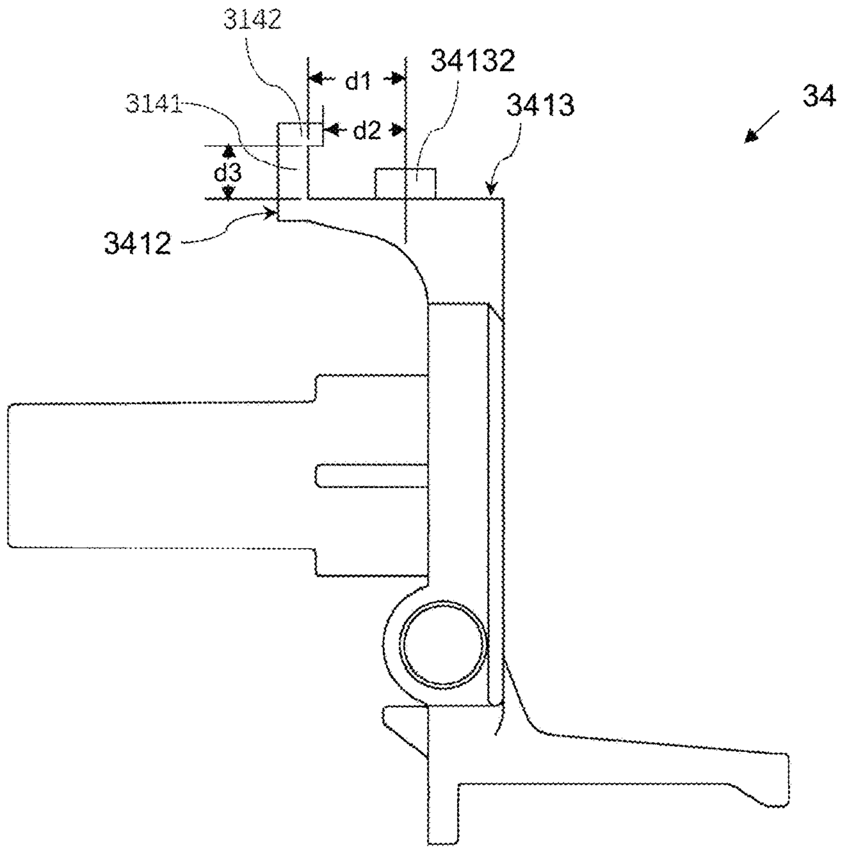
FIG. 28 shows schematically an orthographic projection view of the piston according to one embodiment of the invention.

As shown in FIG. 28, the limiting portion 34133 of the striker mounting portion 3413 of the piston 34 is a hook-shaped member. The hook-shaped member 3412 has a first extension section 3141 vertically extending from the edge of the striker mounting portion 3413 toward the striker baffle plate and having a height d3, with its extending direction perpendicular to the motion direction of the piston 34; a second extension section 3142 extending from the end of the first extension section 3141 toward the muzzle, with its extension direction parallel to the motion direction of the piston 34.

Figure 29:
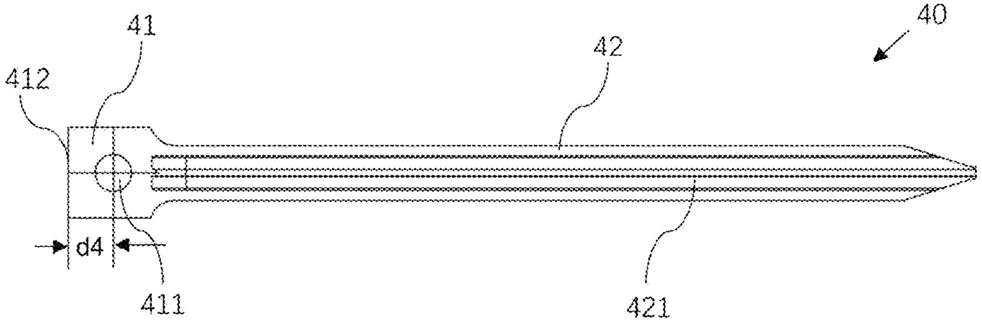
FIG. 29 shows schematically a bottom view of the striker according to one embodiment of the invention.
Figure 30:
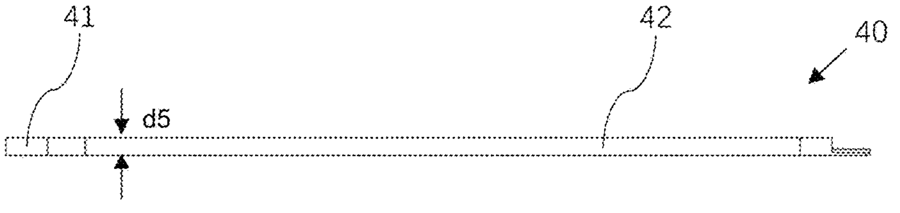
FIG. 30 shows schematically a side view of the striker according to one embodiment of the invention.

As shown in FIGS. 28-30, the height d3 of the first extension section 3141 is greater than a thickness d5 of the striker 40, as shown FIG. 30, i.e., d3>d5, which ensures the striker 40 to be securely received in the hook-shaped member 3412 when assembled. Along the reciprocating direction, the distance d1 between the first extension section 3141 and the post 34132 of the striker mounting portion 3413 is greater than the distance d4 from the end of the striker 40 to the mounting hole 411 of the striker 40, as shown in FIG. 29, i.e., d1>d4. which ensures the striker 40 to be inserted in the hook-shaped member 3412 during assembling or to be taken out from the hook-shaped member 3412 during disassembling.

In addition, along the reciprocating direction, the distance d2 between the end of the second extension section 3142 and the post 34132 is less than the distance d4 from one end of the striker 40 to the mounting hole 411, i.e., d2<d4, which ensures the striker 40 not to be moved out from the hook-shaped member 3412 during operation.

As shown in FIGS. 31-32, due to the structures and size settings as disclosed above, during installation, the mounting portion 41 of the striker 40 can be inserted obliquely into the hook-shaped striker limiting portion 34133, that is, the striker 40 is tilted along its length direction, and then flatten the striker 40 downward, so that the connecting post 34132 is embedded/snapped in the mounting hole 411.

Figure 33:
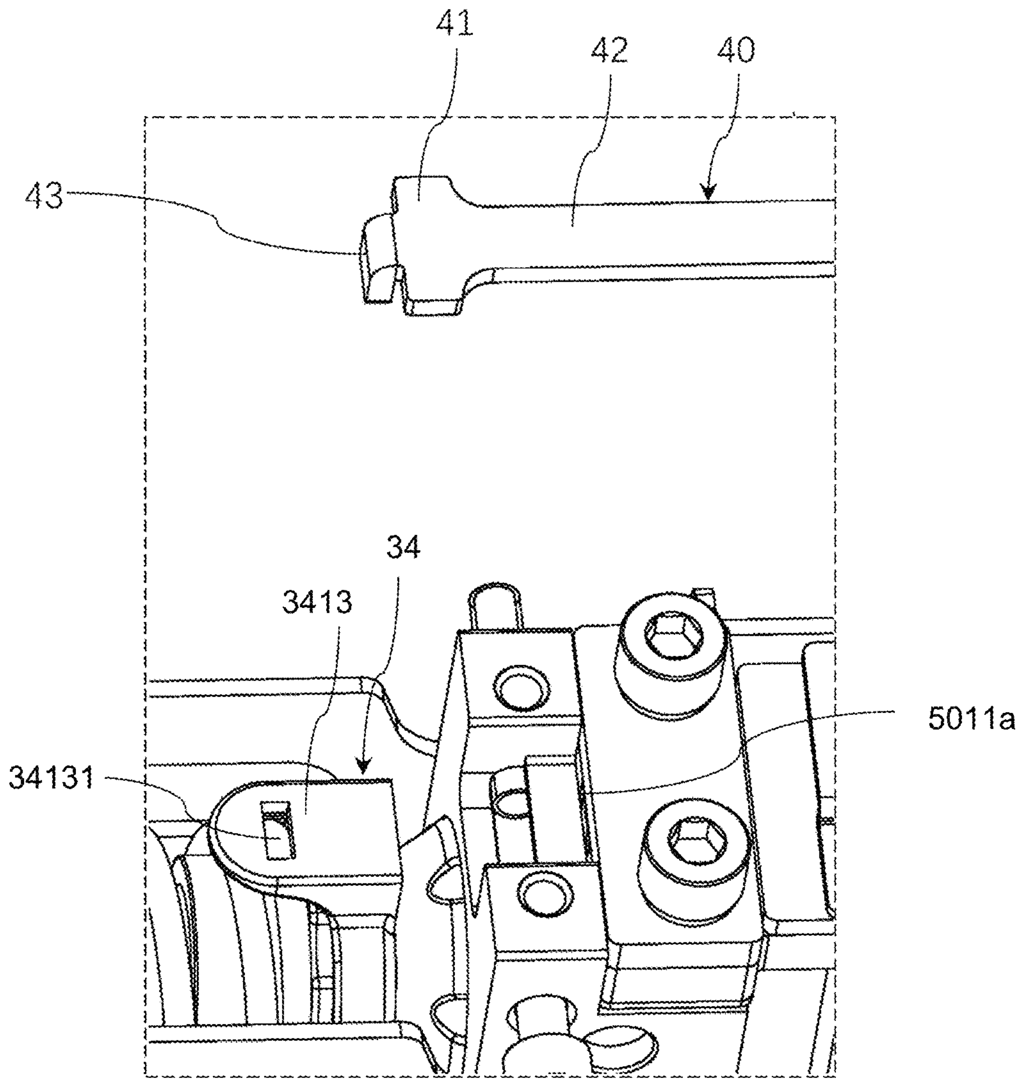
FIG. 33 shows schematically a partially exploded view of the striker and the piston according to one embodiment of the invention.

Referring to FIG. 33, the striker 40 and the piston 34 and the assembling and disassembling procedures thereof are shown according to yet another embodiment of the invention. The striker mounting portion 3413 of the piston 34 has a mounting hole 34131; and the mounting portion 41 of the striker 40 has a protruding portion (tab) 43 vertically extending from its end, wherein the protruding portion 43 is corresponding to the mounting hole 34131. Specifically, the mounting portion 41 is in the shape of a square plate, and the protruding portion 43 is also in the shape of a square plate, and its width is smaller than the width of the mounting portion 41. The protruding portion 43 extends vertically from the edge of the end of the mounting portion 41 in the shape of a square plate. The extending direction of the protruding portion 43 is also perpendicular to the reciprocating direction. The mounting hole 34131 on the piston 34 matches the protruding portion 43, and the depth of the mounting hole 34131 is basically consistent with the extended length of the protruding portion 43.

When assembling, the protruding portion 43 of the mounting portion 41 of the striker 40 is snapped and received in the mounting hole 34131 of the striker mounting portion 3413 of the piston 34. Then, the striker 40 is securely installed onto the piston 34.

According to the present invention, the striker driving mechanism 30 includes a regulating frame 31, a piston 34, a spring assembly 33 and a pushing member 36. The spring assembly 33 includes a first force supply spring 331 and the second force supply springs 332 have one end fixed on the regulating frame 31, and the other end is in contact with the piston 34. Therefore, the two force supply springs operable provide driving power/force for the movement of the piston 34, the movement of the piston 34 drives the movement of the striker 40, thereby striking the nails. The pushing member 36 operably pushes the piston 34 to move in the direction of the spring assembly 33, thereby simultaneously compressing and accumulating energy on the first force supply spring 331 and the second force supply spring 332. The piston 34 includes a piston body 341 and the first piston protection member 342 and the second piston protection member 343 formed on the piston body 341 and facing the pushing member 37. Since the piston body 341 is made of aluminum, compared with the iron piston in the prior art, the overall weight of the piston 34 is greatly reduced, so the nail gun 10 can effectively increase the nail driving force without increasing energy consumption. When the piston 34 is pushed by the pushing member 37, the pushing member 37 directly contacts and pushes the first piston protection member 342 and the second piston protection member 343, thereby pushing the piston 34 accordingly. Because the first piston protection member 342 and the second piston protection member 343 is an iron material, which is more wear-resistant, so it protects the aluminum piston body 341, making the piston 34 have a longer service life.

In some embodiments, the piston body 341 has a first thrust portion 3414 extending along the nail firing direction and a second thrust portion 3415 extending toward the pushing member 37 and perpendicular to the first thrust portion 3414. The outer surface of the first thrust portion 3414 is covered by a protection piston member 342 to form a first thrust end 345, while the second piston protector 343 wraps on the outer surface of the second thrust portion 3415 to form a second thrust end 346. The piston protection member 342 and the second piston protection member 343 are both made of iron material. Therefore, the piston 34 has a wear-resistant first thrust end 345 and a second thrust end 346, so that the piston 34 can reciprocate during the reciprocating motion. There is very little wear and the service life of the piston 34 is correspondingly longer.

Furthermore, due to the regulating frame 31 and the guide rod 32, the piston 34 is movably sleeved on the guide rod 32 through the sleeve through hole 34121, and a pair of rolling elements 35 is rollably fitted on both sides of the piston 34, respectively, and is in contact with the corresponding sides of the regulating plate 313. Therefore, the movement direction of the piston 34 can be regulated through the regulating frame 31, the guide rod 32 and the rolling element 35, so that the piston 34 can only move in the predetermined reciprocating direction, without moving or deflecting in other directions. In addition, since the regulating frame 31 is an open, detachable square frame, and a plurality of relief holes 3131 are provided on the two regulation plates 313, compared with the existing cylinder-type regulation structure, the overall weight of the regulating frame 31 is lighter, thereby reducing the user's labor intensity. Meanwhile, the structures of opening and detachable frame also make the inspection and maintenance easier.

Furthermore, since the diameter of the sleeve through hole 34121 of the piston 34 is larger than the diameter of the guide rod 32, and the inner wall of the sleeve through hole 34121 is smooth, the friction between the piston 34 and the guide rod 32 is very small when it moves. The piston 34 is operably coupled with the regulating plate 313 through a pair of rolling elements 35 (steel balls) without directly contacting the regulating plate 313. Therefore, the friction between the piston 34 and the regulating plate 313 is also very small when it moves. Also, because there is the plurality of exhaust through holes 34113 on the piston 34 also reduces the wind resistance encountered by the piston 34 when it moves. Therefore, according to the invention, a low-resistance piston structure can also effectively increase the nail driving force without increasing energy consumption.

In addition, the pushing member 37 is a cam, which is installed at the output end of the driving motor 38. The cam has a first pushing protrusion 3711 and a second pushing protrusion 3712, which are operably engaged with the first thrust end 345 and the second thrust end 346 of the piston 34, respectively. Therefore, the driving motor 38 can drive the pushing member 37 to rotate. When the pushing member 37 rotates, first, the second pushing protrusion 3712 abuts against and pushes the second thrust end 346, whereby the second thrust end 346 of the piston 34 exerts an arc-shaped pushing force toward the direction of energy storage. The piston 34 moves toward the direction of energy storage under the action of this driving force and the regulatory structure, thus compressing the two force supply springs to complete the first stage of energy storage. When the pushing member 3737 continues to rotate, the second pushing protrusion 3712 is separated from the second thrust end 346, and meanwhile, the first pushing protrusion 3711 abuts against and pushes the first thrust end 345, thereby completing the second stage of energy storage in the same way. Accordingly, the striker driving mechanism 30 operably performs two stages of energy storage, thereby obtaining greater ejection force. In addition, the output end of the drive motor 38 is also equipped with a one-way bearing 39, so the cam will not reverse during the energy storage stages and after the energy storage is completed, thereby avoiding the situation of accidentally firing nails and improving the operation safety.

Moreover, since the body casing 21 of the nail gun 10 has a replacement opening 213, the striker baffle plate 22 is detachably installed on the replacement opening 213. The replacement opening 213 is configured to accommodate the mounting portion 41 of the striker 40. The accommodating groove opening 5011*a* of the groove 5011 is completely exposed, so the striker 40 can be replaced conveniently and quickly through the replacement opening 213 after the striker baffle plate 22 is removed. In addition, the replacement opening 213 also corresponds to the opening direction and position of the regulating frame 31. Therefore, the regulating frame 31 and its internal components such as the piston 34 and the spring assembly 33 can also be inspected through the replacement opening 213.

In some embodiments, the first piston protection member 342 and the second piston protector 343 are made of iron, while the piston body 341 is made of plastic material and is cast on the first piston protection member 342 and the second piston protection member 342 by an iron-plastic composite method on the piston protector 343 to form an integrated piece. Since the piston body 341 is made of plastic material, the overall weight of the piston 34 is lighter. Accordingly, the nail gun 10 has a stronger nail driving force. In addition, iron-plastic composite also has the advantages of convenient processing and low cost.

In some embodiments, the first thrust portion 3414 and the second thrust portion 3415 of the piston 34 are respectively coated with titanium coatings to form a wear-resistant protective layer. Since the titanium material has higher strength, it can further extend the service life of the piston 34. According to the invention, only the two pushing parts of the piston 34 need to be coated, the coating area is small, so the cost is not high.

In some embodiments, the guide rod 32 is a circular rod. Correspondingly, the guide rod mounting hole 3111 of the limit base 311, the limit through hole 3121 of the limiting plate 312, and the sleeve through hole 34121 of the piston 34 are all circular through-holes matching with the circular rod. In other embodiments, the guide rod 32 can also be a square rod, that is, its cross-section along the nail firing direction is set to be square. Correspondingly, the limit through hole 3121 of the limiting plate 312, and the sleeve through hole 34121 of the piston 34 are all square through holes matching with the square rod. The square guide rod 32 and the corresponding square holes can also regulate the piston 34 so that it cannot go around the guide rod. 32 makes a circular motion, so it can achieve better regulation effects.

In some embodiments, the piston body 341 is made of plastic, and is cast on an iron component to form an iron-plastic composite integrated piece. In other solutions of the present invention, the piston body 341 can also be an insert made of plastic. The first piston protection member 342 and the second piston protection member 343 are inlaid together to form an iron-plastic composite integrated piece.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference.

What is claimed is:

1. A striker driving mechanism used for driving a striker of a nail gun to fire nails, comprising:

a frame structure;

a piston movably arranged in the frame structure;

at least one spring disposed between the piston and the frame structure and configured to provide driving force for movements of the piston;

a pushing member having a pushing end toward the piston, and configured to push the piston toward the at least one spring, thereby compressing the at least one spring to store energy therein;

a guide rod installed in the frame structure and extending along a length direction of the frame structure; and at least one pair of rolling elements respectively rollably fitted on both sides of the piston and respectively in contact with the frame structure, wherein the striker is co-movably connected to the piston;

wherein the at least one spring is sleeved on the guide rod; and wherein the piston comprises a piston body, made of lightweight materials; a piston protector, configured to match the pushing end of the pushing member and installed on the piston body and facing the pushing member, wherein the piston protector is made of wear-resistant material; and a sleeving through hole defined a middle portion of the piston body, and wherein the piston is movably sleeved on the guide rod through the sleeving through hole.

2. The striker driving mechanism of claim 1, wherein the piston body is made of an aluminum material and has a push portion extending toward the pushing member; and the piston protector is made of an iron material covering the pushing portion, or titanium coating on the push portion.

3. The striker driving mechanism of claim 1, wherein the piston protector is made of an iron material; and the piston body is made of plastic and is cast on the piston protector through an iron-plastic composite method to form an integrated piece.

4. The striker driving mechanism of claim 1, wherein the piston further has a plurality of exhausting through holes distributed around the sleeving through hole, wherein an extension direction of each exhausting through hole is consistent with a length direction of the guide rod.

5. The striker driving mechanism of claim 1, wherein the frame structure has two regulating plates, two regulating plates extending along the length direction of the frame structure; and the piston body has two grooves defined both sides thereof, wherein the at least one pair of rolling elements are respectively rollably engaged in the two grooves and are respectively in contact with the two regulating plates on a corresponding side.

6. The striker driving mechanism of claim 5, wherein each of the at least one pair of rolling elements is a ball; and each of the two grooves is a round bottom groove matching the ball, wherein a diameter of the ball is greater than a depth of the groove.

7. The striker driving mechanism of claim 1, wherein the guide rod is a circular or square rod; and the sleeving through hole is a circular or square through hole matching the guide rod.

8. The striker driving mechanism of claim 1, wherein the piston protector comprises a first piston protection member and a second piston protection member;

the first piston protection member and the second piston protection member are attached onto the piston body to form a first thrust end and a second thrust end, respectively;

the first thrust end extends from the piston body along a nail firing direction;

the second thrust end extends from the piston body perpendicularly to the first thrust end and toward the pushing member;

the pushing member includes a wheel body and a first pushing protrusion and a second pushing protrusion arranged on the wheel body and facing the piston;

the first pushing protrusion and the second pushing protrusion are the pushing end;

a height of the first pushing protrusion is higher than that of the second pushing protrusion;

the first pushing protrusion is arranged corresponding to the first thrust end;

the second pushing protrusion corresponds to a setting of the second thrust end;

when the wheel body rotates, the second pushing protrusion abuts against the second thrust end and pushes the second thrust end, so that the piston moves toward the at least one spring, thereby causing the at least one spring to perform a first stage of energy storage; and after the first stage of energy storage is completed, the first pushing protrusion in in contact with the first thrust end and pushes the first thrust end, so that the piston moves further toward the at least one spring, thereby causing the at least one spring to perform a second stage of energy storage.

9. The striker driving mechanism of claim 8, further comprising:

a driving motor for driving the pushing member to rotate, a rotation of the pushing member drives the first and second thrust ends to move, thereby pushing the piston to move toward the at least one spring; and one-way bearing, coupled to the driving motor for limiting the driving motor to rotate only in one direction, wherein the wheel body is coupled to an output end of the driving motor.

10. The striker driving mechanism of claim 1, wherein the piston further comprises a striker mounting portion formed on a top side of the piston body; and the striker has a mounting portion that is detachably mounted onto the striker mounting portion of the piston through screws and/or snap-in connection means so that the striker is operably co-moved with the piston.

11. The striker driving mechanism of claim 10, wherein each of the mounting portion of the striker and the striker mounting portion of the piston has at least one mounting hole through which a screw or a snap-in connector detachably mounts the mounting portion of the striker onto the striker mounting portion of the piston, wherein the snap-in connector having a cap and a post extending from the cap and inserted into the at least one mounting hole.

12. The striker driving mechanism of claim 10, wherein the striker mounting portion of the piston has a limiting part vertically extending from an edge of the striker mounting portion;

one of the mounting portion of the striker and the striker mounting portion of the piston has at least one post, and another of the mounting portion of the striker and the striker mounting portion of the piston has at least one hole corresponding to the at least one post; and when assembled, the at least one post of said one of the mounting portion of the striker and the striker mounting portion of the piston is snapped and received in the at least mounting hole of said another of the mounting portion of the striker and the striker mounting portion of the piston, and the mounting portion of the striker is in contact with the limiting part of the striker mounting portion of the piston.

13. The striker driving mechanism of claim 12, wherein the limiting part of the striker mounting portion of the piston is a hook-shaped member, wherein the hook-shaped member has:

a first extension section vertically extending from the edge of the striker mounting portion toward a striker baffle plate and having a height, with an extending direction of the first extension section perpendicular to a motion direction of the piston;

a second extension section extending from the end of the first extension section toward the muzzle, with an extension direction of the second extension section parallel to the motion direction of the piston, the height of the first extension section is greater than a thickness of the striker, a distance between the first extension section and the at least one post or the at least mounting hole of the striker mounting portion is greater than the distance from the end of the striker to the at least mounting hole or the at least one post of the striker; and along the motion direction of the piston, the distance between the end of the second extension section and the at least one post or the at least mounting hole of the striker mounting portion is less than the distance from the end of the striker to the at least mounting hole or the at least one post of the striker.

14. The striker driving mechanism of claim 10, wherein the striker mounting portion of the piston has a mounting hole;

the mounting portion of the striker has a tab vertically extending from an end of the mounting portion, wherein the tab is corresponding to the mounting hole; and when assembled, the tap of the mounting portion of the striker is snapped and received in the mounting hole of the striker mounting portion of the piston.

15. A nail gun for nailing, comprising:

the striker driving mechanism of claim 1, wherein the piston further comprises a striker mounting portion formed on a top side of the piston body; and the striker has a mounting portion that is detachably mounted onto the striker mounting portion of the piston through screws and/or snap-in means so that the striker is operably co-moved with the piston.

16. The nail gun of claim 15, further comprising:

a body casing configured to house the striker driving mechanism therein, and having an opening defined in a tap of the body casing for facilitating maintenance of the striker driving mechanism; and a striker baffle plate detachably attached onto the body casing to cover the opening.

17. The nail gun of claim 16, wherein the striker baffle plate is detachably attached onto the body casing by screws and/or snap-in connection means.

18. The nail gun of claim 17, wherein the striker baffle plate has a buckle formed on an end of the striker baffle plate, and the body casing has a slot configured such that, as assembled, the buckle of the striker baffle plate is engaged with the slot of the body casing to restrict the striker baffle plate from moving in a nail firing direction.

19. The nail gun of claim 18, wherein the buckle comprises a first extension portion extending substantially vertically downward from an inner side of the striker baffle plate and a second extension portion extending from the first extension portion along a length direction of the striker baffle plate, wherein as assembled, the second extension portion extends into the slot of the body casing to engage the buckle with the slot.

* * * * *